(12) United States Patent  (10) Patent No.: US 9,405,759 B2
Li et al.  (45) Date of Patent: Aug. 2, 2016

(54) INFORMATION PROCESSING METHOD AND ELECTRONIC DEVICE

(71) Applicant: Lenovo (Beijing) Co., Ltd., Beijing (CN)

(72) Inventors: Kai Li, Beijing (CN); Wei Huang, Beijing (CN); Wenhui Lu, Beijing (CN); Kangli Zhao, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 197 days.

(21) Appl. No.: 14/229,450

(22) Filed: Mar. 28, 2014

(65) Prior Publication Data

US 2015/0142757 A1  May 21, 2015

(51) Int. Cl.
*G06F 17/00* (2006.01)
*G06F 17/30* (2006.01)
*G06F 3/0481* (2013.01)
*G06F 3/0484* (2013.01)

(52) U.S. Cl.
CPC ........ *G06F 17/30117* (2013.01); *G06F 3/0481* (2013.01); *G06F 3/0484* (2013.01); *G06F 17/30091* (2013.01)

(58) Field of Classification Search
None
See application file for complete search history.

(56) References Cited

U.S. PATENT DOCUMENTS 4,730,314 A * 3/1988 Noguchi ................. G06F 11/25 714/724
8,995,339 B2 * 3/2015 Buyukkoc ............... H04W 4/00 370/328
9,250,871 B2 2/2016 Hwang et al.
2007/0239570 A1 * 10/2007 Kam-Chak Cheng . G06Q 10/10 705/35

(Continued)

FOREIGN PATENT DOCUMENTS

CN 102365619 A 2/2012
CN 102591586 A 7/2012

(Continued)

OTHER PUBLICATIONS

First Chinese Office Action regarding Application No. 201310607236.7 dated Jan. 8, 2016. English translation provided by Unitalen Attorneys at Law.

(Continued)

*Primary Examiner* — Hung Le
(74) *Attorney, Agent, or Firm* — Harness, Dickey & Pierce, P.L.C.

(57) ABSTRACT

The disclosure provides an information processing method and an electronic device. The electronic device generates M components to be embedded into a first application program when installing a recording application program, M is an integer greater than or equal to 1. There is an association relationship between the M components and the recording application program. In a case where the M components are embedded into the first application program, the method includes: when the first application program runs, displaying a first graphical interface corresponding to the first application program by the electronic device, the first graphical interface including the M components; obtaining a first triggering operation for a first component of the M components; collecting, in response to the first triggering operation, first data content under the first graphical interface directly; and storing the collected first data content.

17 Claims, 24 Drawing Sheets

(56) References Cited

U.S. PATENT DOCUMENTS

| | | |
|---|---|---|
| 2010/0192078 A1 | 7/2010 | Hwang et al. |
| 2011/0163968 A1* | 7/2011 | Hogan ................ G06F 3/04883 345/173 |
| 2011/0164058 A1* | 7/2011 | Lemay .................. G06F 3/0488 345/651 |
| 2013/0174100 A1* | 7/2013 | Seymour .............. G06F 3/0487 715/863 |
| 2013/0263184 A1* | 10/2013 | Melnychenko ...... H04N 21/482 725/50 |
| 2013/0329632 A1* | 12/2013 | Buyukkoc .............. H04W 4/00 370/328 |
| 2014/0121789 A1* | 5/2014 | Brandes ................ G05B 15/02 700/80 |
| 2014/0165006 A1* | 6/2014 | Chaudhri ........... G06F 3/04817 715/835 |
| 2014/0245203 A1* | 8/2014 | Lee .................... G06F 3/04817 715/765 |
| 2014/0282016 A1* | 9/2014 | Hosier, Jr. ............... H04W 4/08 715/733 |
| 2015/0074615 A1* | 3/2015 | Han ................... G06K 9/00033 715/863 |
| 2015/0138155 A1* | 5/2015 | Bernstein .............. G06F 3/0412 345/174 |
| 2015/0149964 A1* | 5/2015 | Bernstein ............ G06F 3/04815 715/836 |

FOREIGN PATENT DOCUMENTS

| | | |
|---|---|---|
| CN | 102789366 A | 11/2012 |
| CN | 103246673 A | 8/2013 |
| EP | 2293203 A1 | 3/2011 |

OTHER PUBLICATIONS

First Chinese Office Action regarding Application No. 201310590746.8 dated Feb. 2, 2016. English translation provided by Unitalen Attorneys at Law.

* cited by examiner

INFORMATION PROCESSING METHOD AND ELECTRONIC DEVICE

The present application claims the priority of Chinese Patent Application No. 201310590746.8, entitled as "Information processing method and electronic device", and filed with the Chinese Patent Office on Nov. 20, 2013, Chinese Patent Application No. 201310606786.7, entitled as "Information processing method and electronic device", and filed with the Chinese Patent Office on Nov. 25, 2013, and Chinese Patent Application No. 201310607236.7, entitled as "Information processing method and electronic device", and filed with the Chinese Patent Office on Nov. 25, 2013, the contents of which are incorporated herein by reference in its entirety.

FIELD

The disclosure relates to the field of information processing technology, and particularly to an information processing method and an electronic device.

BACKGROUND

With the development of electronic technology, electronic devices are becoming more widely used, and can implement more and more functions. Among others, an information processing function, such as data collection and storage, can be implemented by the electronic device.

However, in the convention, in a case where the electronic device performs information processing, different processing of the electronic device on information requires different operations, and which need to be implemented in different operation interfaces. For example, in a case of image collection, there is a need to start a camera to trigger collection of images and store the collected images; and in a case of viewing images, there is a need to start an image viewer to trigger acquisition of the stored images and output the acquired images, to view the images. Therefore, in the convention, for the different processing on information, there is a need for a user to operate the electronic device repeatedly, and at least multiple or multi-group physical buttons or virtual controls are required, resulting in many operating steps and high operation complexity. For example, in one information collection method, there is a need to start at least a user interaction interface for information collection, so as not to display the display content in the current interface for the electronic device; thereafter, the data collection and storage the like may be implemented by operating the user interaction interface, resulting in a low information processing speed.

SUMMARY

In view of this, the disclosure provides an information processing method and an electronic device, for solving the technical problem in the convention that the information processing speed is low.

To achieve the above object, the disclosure provides technical solutions as follows.

An information processing method applied to an electronic device, wherein the electronic device generates M components to be embedded into a first application program when installing a recording application program, M is an integer greater than or equal to 1, there is an association relationship between the M components and the recording application program, and in a case where the M components are embedded into the first application program, the method including:

when the first application program runs, displaying a first graphical interface corresponding to the first application program by the electronic device, the first graphical interface including the M components;

obtaining a first triggering operation for a first component of the M components;

collecting, in response to the first triggering operation, first data content under the first graphical interface directly; and storing the collected first data content, so that the first data content can be obtained when the recording application program runs.

Preferably, a second component of the M components in the first graphical interface outputs at least part of the first data content.

Preferably, the electronic device further includes K input units, the K input units having a one-to-one correspondence with K components of the M components, K being an integer greater than or equal to 1.

The collecting, in response to the first triggering operation, first data content under the first graphical interface directly includes:

in response to the first triggering operation, calling a first input unit of the K input units that corresponds to the first component to collect first data content under the first graphical interface directly.

Preferably, the collecting, in response to the first triggering operation, first data content under the first graphical interface directly includes:

collecting, in response to the first triggering operation, first data content of display content in the first graphical interface.

Preferably, the collecting, in response to the first triggering operation, first data content under the first graphical interface directly includes:

in response to the first triggering operation, collecting first data content and keeping at least part of display content in the first graphical interface unchanged.

Preferably, after the collecting first data content under the first graphical interface directly, the method further includes:

in response to a triggering operation for at least one other component of the M components that is different from the first component, collecting at least one second data content an attribute parameter of which is different from an attribute parameter of the first data content; and storing the first data content and the at least one second data content as one data record in a corresponding way, so that the first data content and the at least one second data content corresponding to the first data content in the data record can be obtained when the recording application program runs.

An electronic device, wherein the electronic device generates M components to be embedded into a first application program when installing a recording application program, M is an integer greater than or equal to 1, there is an association relationship between the M components and the recording application program, and in a case where the M components are embedded into the first application program, the electronic device includes:

a display unit, adapted to display a first graphical interface corresponding to the first application program when the first application program runs, the first graphical interface including the M components;

a detection unit, adapted to obtain a first triggering operation for a first component of the M components;

a first response unit, adapted to collect, in response to the first triggering operation obtained by the detection unit, first data content under the first graphical interface directly; and a first storage unit, adapted to store the collected first data content, so that the first data content can be obtained when the recording application program runs.

Preferably, the electronic device further includes an output unit adapted to output at least part of the first data content on a second component of the M components in the first graphical interface.

Preferably, the electronic device further includes K input units, the K input units having a one-to-one correspondence with K components of the M components, K being an integer greater than or equal to 1.

The first response unit is adapted to call, in response to the first triggering operation, a first input unit of the K input units that corresponds to the first component to collect first data content under the first graphical interface directly.

Preferably, the first response unit is adapted to collect, in response to the first triggering operation, first data content of display content in the first graphical interface.

Preferably, the first response unit is adapted to collect first data content and keep at least part of display content in the first graphical interface unchanged, in response to the first triggering operation.

Preferably, the electronic device further includes:

a second response unit, adapted to collect, in response to a triggering operation for at least one other component of the M components that is different from the first component, at least one second data content an attribute parameter of which is different from an attribute parameter of the first data content; and a second storage unit, adapted to store the first data content and the at least one second data content as one data record in a corresponding way, so that the first data content and the at least one second data content corresponding to the first data content in the data record can be obtained when the recording application program runs.

As can be known from the above technical solutions, compared with the convention, the disclosure provides an information processing method and an electronic device: in which, M components associated with a recording application program in the electronic device are embedded into a first application program; and when the first application program runs, a first graphical interface displayed by a display unit includes the M components, thereby a user may perform a triggering operation for the M components in the first graphical interface. In a case where a first triggering operation for a first component of the M components is detected, in response to the first triggering operation, first data content is collected directly under the first graphical interface, and the first data content is stored, so that the first data content can be acquired when the recording application program runs. Collection of the corresponding data content can be achieved in the first graphical interface since the M components are operated directly, and there is no need to start other user interaction interfaces, thereby making the operation easy and convenient and achieving fast processing on information.

Preferably, the M components further have a one-to-one correspondence with M input units included in the electronic device, and after the obtaining a first triggering operation for a first component of the M components, the method includes:

generating a first operation instruction;

calling a first input unit corresponding to the first component, the first input unit being adapted to collect first input data;

obtaining a second triggering operation for the first component and generating a second operation instruction, the first triggering operation being the same as the second triggering operation; and output the first input data according to the second operation instruction.

Preferably, the first component has a first state and a second state.

The obtaining a first triggering operation for a first component of the M components and generating a first operation instruction includes:

obtaining a first triggering operation for a first component in a case where the first component is in the first state, and generating a first operation instruction according to the first state of the first component.

The obtaining a second triggering operation for the first component and generating a second operation instruction includes:

obtaining a second triggering operation for the first component in a case where the first component is in the second state, and generating a second operation instruction according to the second state of the first component.

Preferably, the method further includes:

obtaining a third triggering operation for the first component in a case where the first component is in the second state;

generating a third operation instruction according to the second state of the first component and the third triggering operation; and deleting the first input data according to the third operation instruction.

Preferably, after the obtaining a first triggering operation for a first component of the M components, the method further includes:

generating a first switching instruction; and controlling the first component to switch from the first state to the second state according to first switching instruction; and/or, after the obtaining a second triggering operation for the first component, the method further includes:

generating a second switching instruction; and controlling the first component to switch from the second state to the first state according to the second switching instruction.

Preferably, in a case where the first component is in the first state, the method further includes:

displaying a first identifier on the first component.

In a case where the first component is in the second state, the method further includes:

displaying at least one second identifier on the first component.

Preferably, the first component further has a third state, and in a case where the first component is in the third state, the method further includes:

displaying a third identifier on the first component.

Preferably, after the obtaining a first triggering operation for a first component of the M components, the method further includes:

generating a third switching instruction; and controlling the first component to switch from the first state to the third state according to the third switching instruction; and in a case where the first component is in the third state, the method further includes:

obtaining a fourth triggering operation for the first component, and generating a fourth operation instruction and a fourth switching instruction;

saving the first input data according to the fourth operation instruction; and controlling the first component to switch from the third state to the second state according to the fourth switching instruction.

Preferably, the electronic device further includes an image collection unit, the displaying the M components by the display unit includes:

starting the image collection unit, and displaying the M components by the display unit when the display unit displays an image collected in real time by the image collection unit.

Preferably, the electronic device further includes M input units, M being an integer greater than or equal to 1, and wherein the electronic device further includes:

a display unit, adapted to display the M components, the M components having a one-to-one correspondence with M input units;

a first operation instruction generation unit, adapted to obtain a first triggering operation for a first component of the M components and generate a first operation instruction;

a first operation instruction execution unit, adapted to call a first input unit corresponding to the first component, the first input unit being adapted to collect first input data;

a second operation instruction generation unit, adapted to obtain a second triggering operation for the first component and generate a second operation instruction, the first triggering operation being the same as the second triggering operation; and a second operation instruction execution unit, adapted to output the first input data according to the second operation instruction.

Preferably, the first component has a first state and a second state.

The first operation instruction generation unit is adapted to obtain a first triggering operation for a first component in a case where the first component is in the first state, and generate a first operation instruction according to the first state of the first component.

The second operation instruction generation unit is adapted to obtain a second triggering operation for the first component in a case where the first component is in the second state, and generate a second operation instruction according to the second state of the first component.

Preferably, the electronic device further includes:

a third operation instruction generation unit, adapted to obtain a third triggering operation for the first component in a case where the first component is in the second state, and generate a third operation instruction according to the second state of the first component and the third triggering operation; and a third operation instruction execution unit, adapted to delete the first input data according to the third operation instruction.

Preferably, the electronic device further includes:

a first switching instruction generation unit, adapted to generate a first switching instruction after a first triggering operation for a first component of the M components is obtained; and a first switching instruction execution unit, adapted to control the first component to switch from the first state to the second state according to the first switching instruction generated by the first switching instruction generation unit; and/or a second switching instruction generation unit, adapted to generate a second switching instruction after a second triggering operation for the first component is obtained; and a second switching instruction execution unit, adapted to control the first component to switch from the second state to the first state according to the second switching instruction generated by the second switching instruction generation unit.

Preferably, the electronic device further includes:

a first identify unit, adapted to display a first identifier on the first component in a case where the first component is in the first state; and a second identify unit, adapted to display at least one second identifier on the first component in a case where the first component is in the second state.

Preferably, the first component further has a third state, and the electronic device further includes:

a third identify unit, adapted to display a third identifier on the first component in a case where the first component is in the third state.

Preferably, the electronic device further includes:

a third switching instruction generation unit, adapted to generate a third switching instruction after a first triggering operation for a first component of the M components is obtained;

a third switching instruction execution unit, adapted to control the first component to switch from the first state to the third state according to the third switching instruction;

a fourth instruction generation unit, adapted to obtain a fourth triggering operation for the first component and generate a fourth operation instruction and a fourth switching instruction in a case where the first component is in the third state;

an operation execution unit, adapted to save the first input data according to the fourth operation instruction; and a switching execution unit, adapted to control the first component to switch from the third state to the second state according to the fourth switching instruction.

Preferably, the electronic device further includes an image collection unit, and the display unit is adapted to start the image collection unit and display the M components when the display unit displays an image collected in real time by the image collection unit.

As can be known from the above technical solutions, compared with the convention, the disclosure provides an information processing method and an electronic device: in which, the electronic device includes a display unit and M input units, the display unit may display the M components, and the M components have a one-to-one correspondence with the M input units; a first operation instruction may be generated for a first triggering operation for a first component of the M components; a second operation instruction may be generated for a second triggering operation for the first component; and the first operation instruction is adapted to call a first input unit to collect first input data, and the second operation instruction is adapted to output the first input data; therefore, different control operations for the electronic device are implemented by operating a same component, making the operation easy and fast and facilitating the information processing.

BRIEF DESCRIPTION OF THE DRAWINGS

In order to more clearly illustrate the technical solutions in embodiments of the disclosure or in the convention, accompanying drawings referred to describe the embodiments or the convention are introduced simply hereinafter. Obviously, the accompanying drawings in the following description are just some embodiments of the disclosure. For those skilled in the art, other accompanying drawings can also be obtained based on these accompanying drawings provided herein without any creative work.

DETAILED DESCRIPTION

The technical solutions in the embodiments of the disclosure will be described clearly and completely hereinafter in conjunction with the drawings in the embodiments of the disclosure. Apparently, the described embodiments are only a part of the embodiments of the disclosure, rather than all embodiments. Based on the embodiments in the disclosure, all other embodiments, made by those skilled in the art without any creative efforts, fall into the scope of protection of the disclosure.

One of the main ideas of the disclosure may include:

M components associated with a recording application program in the electronic device are embedded into a first application program; and when the first application program runs, a first graphical interface displayed by a display unit includes the M components, thereby a user may perform a triggering operation for the M components in the first graphical interface. In a case where a first triggering operation for a first component of the M components is detected, in response to the first triggering operation, first data content may be collected directly under the first graphical interface, and the first data content is stored, so that the first data content can be acquired when the recording application program runs. Collection of the corresponding data content may be achieved in the first graphical interface since the M components are operated directly, and there is no need to start other user interaction interfaces, thereby making the operation easy and convenient and achieving fast processing on information.

In the following, embodiments of the disclosure may be described in detail in conjunction with the accompany drawings.

Figure 1:
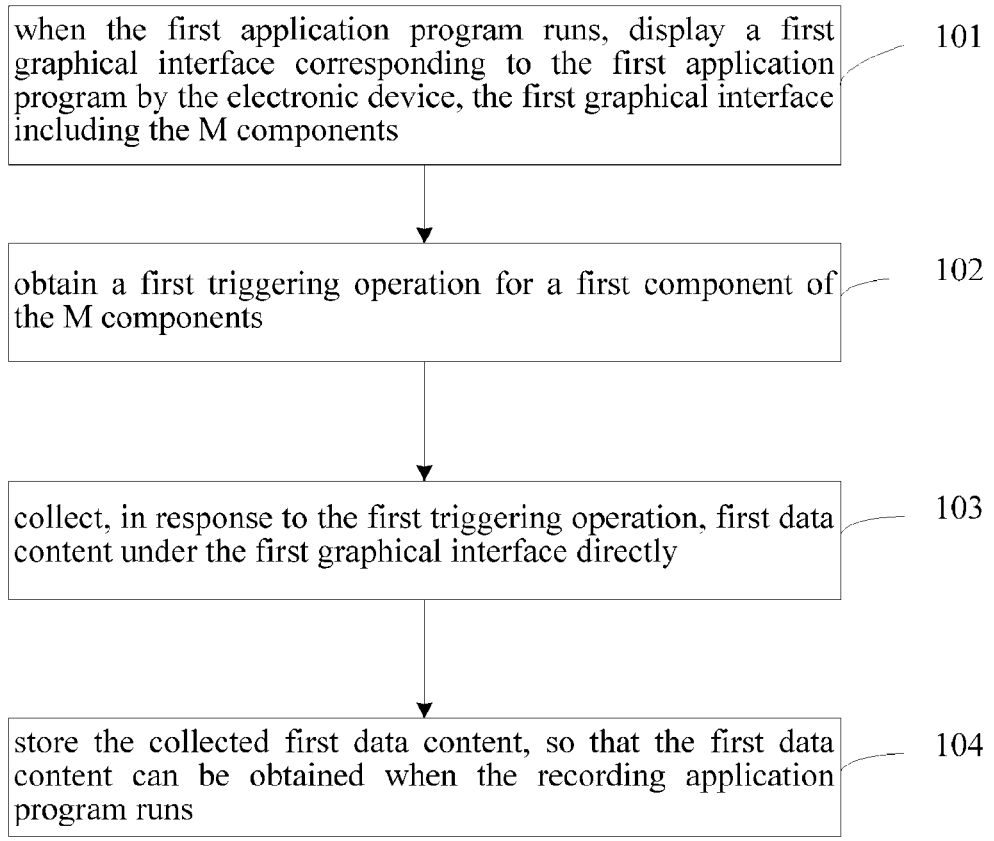
FIG. 1 is a flow chart of an example of an information processing method provided by an embodiment of the disclosure.

FIG. 1 is a flow chart of an example of an information processing method provided by an embodiment of the disclosure. The information processing method is adapted to an electronic device. The electronic device generates M components to be embedded into a first application program when installing a recording application program, M is an integer greater than or equal to 1. There is an association relationship between the M components and the recording application program.

In the embodiment of the disclosure, the electronic device may install and run multiple application programs. Among others, the electronic device may achieve a function such as data content output by running the recording application program. The recording application program is associated with the M components. The M components may be embedded into the first application program when the recording application program is installed in the electronic device. That is, the M components may be started correspondingly when the first application program runs.

The first application program is an application program which has been installed into the electronic device, and a user interaction interface generally appears when the first application runs. The first application program may be for example a desktop application program, a web browser and a mailbox application program.

In a case where the M components are embedded into the first application program, the method may include steps 101 to 104.

101: when the first application program runs, displaying a first graphical interface corresponding to the first application program by the electronic device, the first graphical interface including the M components.

The first graphical interface is a visible user interaction interface output when the first application program runs.

The M components associated with the recording application program may be started correspondingly when the first application program runs, therefore, the M components are output simultaneously in the first graphical interface, and the M components may receive a triggering operation of a user.

In the embodiment of the disclosure, the component may be a Widget or other application plug-ins.

In one possible implementation, the first application program may be a desktop application, and the first graphical interface is the desktop of the electronic device. The M components are embedded into the desktop application program, so that the M components are output when the desktop of the electronic device is displayed.

102: obtaining a first triggering operation for a first component of the M components.

The first component may be any one of the M components. The first triggering operation may be a click operation, a sliding operation or a specific gesture touch or touch-control operation performed on the first component.

103: collecting, in response to the first triggering operation, first data content under the first graphical interface directly; and In response to the first triggering operation, the system may collect the first data content.

The collecting first data content under the first graphical interface directly may include keeping at least part of display content in the first graphical interface unchanged while collecting first data content.

The display content in the first graphical interface may also include the M components.

Therefore, the collection of the first data content may be achieved if only the first triggering operation is performed on the first component, so that there is no need for multiple complicated operation steps, thereby achieving a fast collection operation.

The collected first data content may be implemented in many possible ways, and may be for example audio data content, video data content, image data content and/or text data content. The collection may also be implemented in many different ways, which will be introduced in detail in the following embodiments.

104: storing the collected first data content, so that the first data content can be obtained when the recording application program runs.

After the first data content is collected directly under the first graphical interface, the first data content may be stored. Specifically, the first data content may be stored in the electronic device, and may also be stored in a network server by triggering the electronic device to establish a connection with the network server.

The first data content may be acquired when the recording application program runs, thereby achieving output or performing other processing.

In the embodiment, M components associated with a recording application program in the electronic device are embedded into a first application program; and when the first application program runs, a first graphical interface displayed by a display unit includes the M components, thereby a user may perform a triggering operation for the M components in the first graphical interface. In a case where a first triggering operation for a first component of the M components is detected, in response to the first triggering operation, first data content may be collected directly under the first graphical interface, and the first data content is stored, so that the first data content can be acquired when the recording application program runs. Collection of the corresponding data content may be achieved in the first graphical interface since the M components are operated directly, and there is no need to start other user interaction interfaces, thereby making the operation easy and convenient and achieving fast processing on information.

Figure 2:
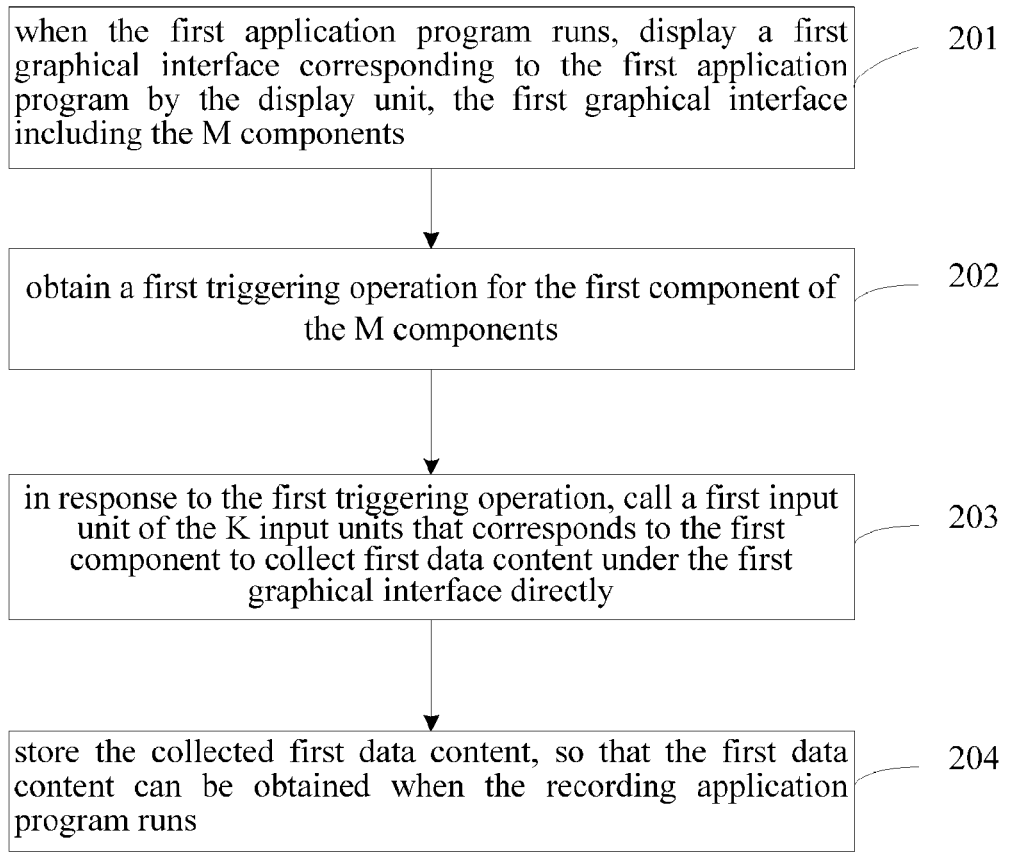
FIG. 2 is a flow chart of another example of an information processing method provided by an embodiment of the disclosure.

FIG. 2 is a flow chart of another example of an information processing method provided by an embodiment of the disclosure. The method is applied to an electronic device. The electronic device includes a display unit. The electronic device generates M components to be embedded into a first application program when installing a recording application program. M is an integer greater than or equal to 1. There is an association relationship between the M components and the recording application program.

In the embodiment of the disclosure, the electronic device may install and run multiple application programs. Among others, the electronic device may achieve a function such as data content output by running the recording application program. The recording application program is associated with the M components. The M components may be embedded into the first application program when the recording application program is installed in the electronic device. That is, the M components may be started correspondingly when the first application program runs.

The first application program may be, for example, a desktop application program, a web browser, a mailbox application program.

In the embodiment, the electronic device may further include K input units, wherein K is an integer greater than or equal to 1. The K input units have a one-to-one correspondence with the K components of the M components. In one possible implementation, K is equal to M.

The input unit is adapted to collect data content, which may include audio data content, image data content, text data content and so on. Accordingly, the input unit may be an audio collection unit, an image collection unit, a text collection unit and so on. In practice, the audio collection unit may be a microphone of the electronic device, the image collection unit may be a camera of the electronic device, and the text collection unit may be a keyboard of the electronic device. In a touch-screen electronic device, the text collection unit may further be a virtual keyboard.

In case where the M components are embedded into the first application program, the method may include Step 201 to Step 204.

Step 201: when the first application program runs, displaying a first graphical interface corresponding to the first application program by the display unit, the first graphical interface including the M components.

Step 202: obtaining a first triggering operation for a first component of the M components.

Step 203: in response to the first triggering operation, calling a first input unit of the K input units that corresponds to the first component to collect first data content under the first graphical interface directly.

In response to the first triggering operation, the first data content of the first input unit corresponding to the first component may be started. At the same time, at least part of the display content in the first graphical interface is kept unchanged.

Figure 2A:
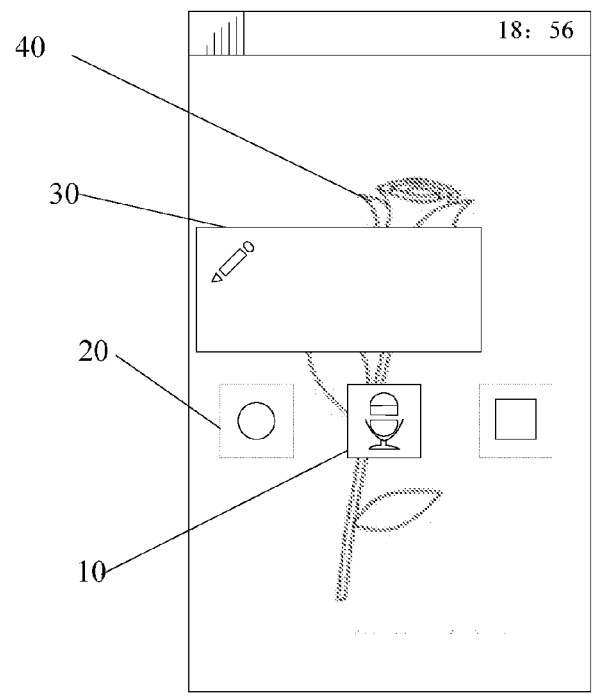
FIG. 2a is a schematic display image of a first graphical interface for an electronic device in an embodiment of the disclosure.
Figure 2B:
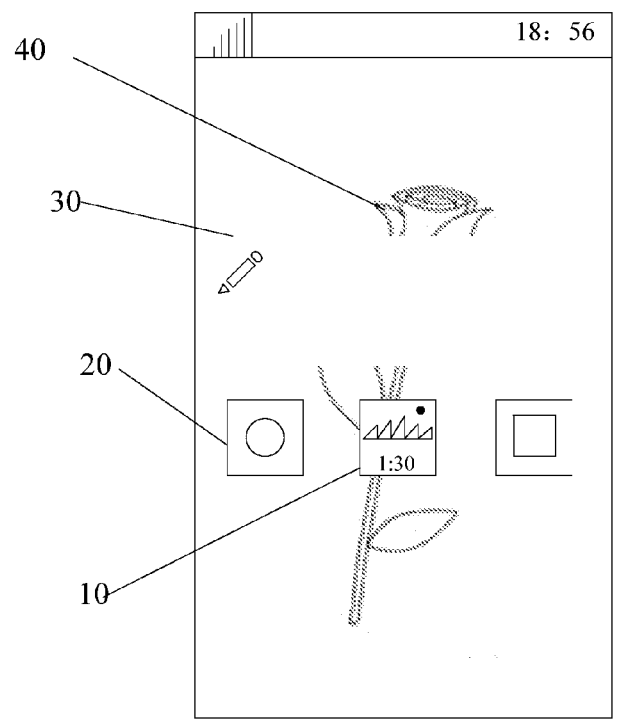
FIG. 2b is another schematic display image of the first graphical interface for an electronic device in an embodiment of the disclosure.
Figure 2C:
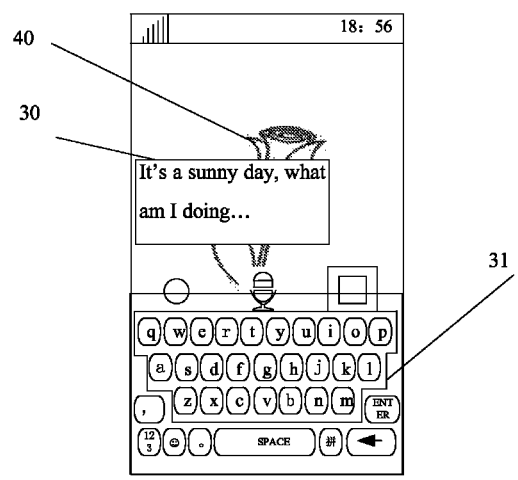
FIG. 2c is yet another schematic display image of the first graphical interface for an electronic device in an embodiment of the disclosure.
Figure 2D:
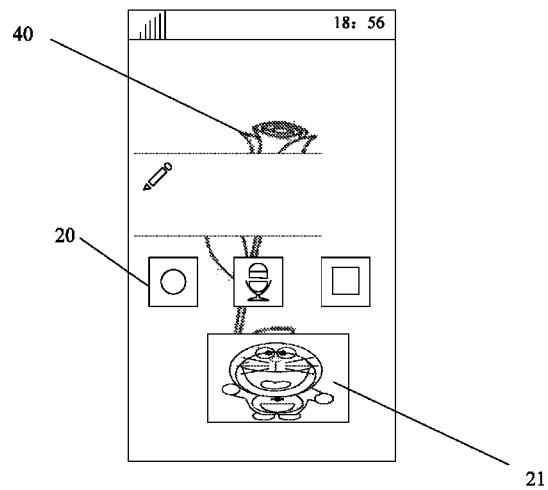
FIG. 2d is yet another schematic display image of the first graphical interface for an electronic device in an embodiment of the disclosure.

FIG. 2a is a schematic display image of a first graphical interface in an embodiment of the disclosure. FIG. 2b is another schematic display image of a first graphical interface in an embodiment of the disclosure. FIG. 2c is yet another schematic display image of a first graphical interface in an embodiment of the disclosure. FIG. 2d is yet another schematic display image of a first graphical interface in an embodiment of the disclosure.

FIG. 2a is a schematic display image of a first graphical interface in an embodiment of the disclosure, the first graphical interface includes M components, and data content is not collected at this moment. The M components may be an audio component 10 for triggering a collection of audio data content, an image component 20 for triggering a collection of image data content and a text component 30 for triggering a collection of text data content and so on.

As illustrated in FIG. 2a, output content 40 of the first application program is displayed in the first graphical interface in addition to M components.

In addition, it should be noted that display positions of the M components in the first graphical interface are not defined in the disclosure, and FIG. 2a to FIG. 2d are only one possible implementation. The electronic device may further update the display positions of the M components in the first graphical interface based on the moving operation of each component by a user, or transform the display positions of the M components based on the current state of the electronic device, such as whether to collect the data content.

FIG. 2b to FIG. 2d are schematic display images when the first component is operated to collect the first data content.

In FIG. 2b, the first component is an audio component 10, audio data content may be collected by calling an audio collection unit corresponding to the audio component 10. As illustrated in FIG. 2b, the first graphical interface is not necessary to exit, and at least part of the display content may be kept unchanged when the audio data content is collected. At the same time, the corresponding identifier may be set on the audio component to prompt the user that the audio data content is being collected. The display state may be recovered from FIG. 2b to FIG. 2a after the audio data content collection is completed.

In FIG. 2c, the first component is an image component 20, the image data content may be collected by calling the image collection unit corresponding to the image component 20. As illustrated in FIG. 2c, a collection region 21 of the image collection unit is displayed at a position where at least part of the display content in the first graphical interface is located. The collection region 21 is in an image preview state and may display the collected image in real time.

In FIG. 2d, the first component is a text component 30, the text data content may be collected by calling the text collection unit corresponding to the text component 30. As illustrated in FIG. 2c, at least part of the display content in a first graphical interface is kept unchanged. The text data content may be collected by calling the text collection unit corresponding to the text component 30. The text collection unit 31 is displayed in the first graphical interface in a case where the text collection unit is a virtual keyboard. The text data content may be input by the text collection unit 31; and the input text data content may be displayed in the text component 30 at the same time. Of course, a text region for displaying the text data content collected by the text collection unit in real time may further be displayed in a position where at least part of the display content in the first graphical interface is located. As illustrated in FIG. 2d, the text data content may be collected directly while the at least part of the display content in the first graphical interface is kept unchanged, i.e., the first graphical interface is still displayed, thereby a quick triggering operation may be implemented. The display state may be recovered from FIG. 2b to FIG. 2a after the text data content collection is completed.

Step 204: storing the collected first data content, so that the first data content can be obtained when the recording application program runs.

The first data content may be stored after the first data content collection is completed.

The storing the first data content may include: obtaining a second triggering operation for the first component, and storing the first data content collected by the first input unit in response to the second triggering operation.

As illustrated in FIG. 2c, the image currently collected in real time may be stored by operating the image component again.

Of course, the storing the first data content may also be implemented by responding to a triggering operation for other operation region in the current first graphical interface.

For example, in FIG. 2c, during collecting the first data content, file data displayed in the text component may be stored by touching a saving control 21 included in the text component 20.

In the embodiment, the M components associated with the recording application program in the electronic device are embedded into the first application program. When the first application program runs, a first graphical interface displayed by a display unit includes the M components, thereby a user may perform a triggering operation for the M components in the first graphical interface. In a case where a first triggering operation for a first component of the M components is detected, in response to the first triggering operation, the first data content may be collected by calling the first input unit corresponding to the first component, while at least part of the display content in the first graphical interface is kept unchanged, thus collection of the corresponding data content may be achieved in the first graphical interface directly. And the first data content is stored, so that the first data content can be acquired when the recording application program runs. Since the M components are operated directly, collection of the corresponding data content may be achieved while the first graphical interface is kept unchanged, thereby making the operation easy and convenient and achieving fast processing on information.

Figure 3:
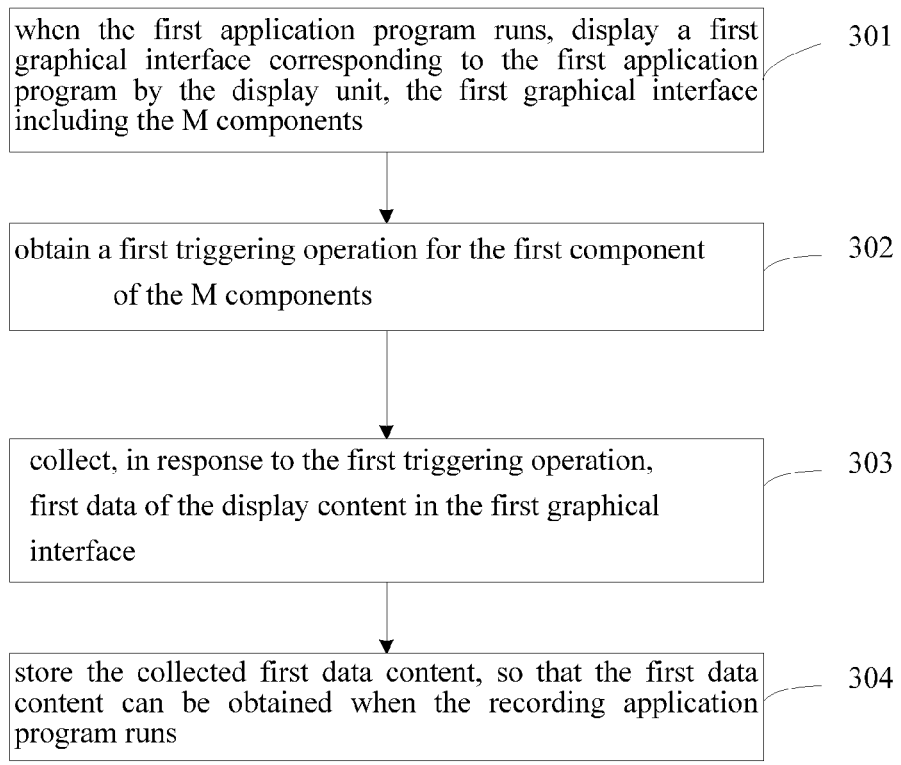
FIG. 3 is a flow chart of yet another example of an information processing method provided by an embodiment of the disclosure.

FIG. 3 is a flow chart of yet another example of an information processing method provided by an embodiment of the disclosure.

The method is applied to an electronic device. The electronic device includes a display unit. The electronic device generates M components to be embedded into a first application program when installing a recording application program. M is an integer greater than or equal to 1. There is an association relationship between the M components and the recording application program.

In the embodiment of the disclosure, the electronic device may install and run multiple application programs. Among others, the electronic device may achieve a function such as data content output by running the recording application program. The recording application program is associated with the M components. The M components may be embedded into the first application program when the recording application program is installed in the electronic device. That is, the M components may be started correspondingly when the first application program runs.

The first application program may be, for example, a desktop application program, a web browser, a mailbox application program.

In case where the M components are embedded into the first application program, the method may include Step 301 to Step 304.

Step 301: when the first application program runs, displaying a first graphical interface corresponding to the first application program by the display unit, the first graphical interface including the M components.

Step 302: obtaining a first triggering operation for a first component of the M components.

Step 303: collecting, in response to the first triggering operation, first data content of the display content in the first graphical interface.

When the first data content of the display content in the first graphical interface is collected, the display content in the first graphical interface may be kept unchanged, or at least part of the display content may be kept unchanged.

The display content in the first graphical interface may include text data content, image data content, audio data content, video data content and so on. Accordingly, the first data content may be text data content, image data content, audio data content, video data content and so on included in the data content, or data content corresponding to the predetermined region in the first graphical interface.

There are many ways to collect the first data content of the display content in the first graphical interface. For example, in case of text or image data content, the first data content may be collected by acquiring a data content in the first graphical interface and analyzing and recognizing the text or image data content and so on included in the data content; and in case of audio or video data content, the first data content may be acquired from the storage unit which stores the audio or video data content.

Step 304: storing the collected first data content, so that the first data content can be obtained when the recording application program runs.

In the embodiment, the M components associated with the recording application program in the electronic device are embedded into the first application program. When the first application program runs, a first graphical interface displayed by a display unit includes the M components, thereby a user may perform a triggering operation for the M components in the first graphical interface. In a case where a first triggering operation for a first component of the M components is detected, in response to the first triggering operation, the first data content may be collected from the display content in the first graphical interface, so that the first data content may be collected directly under the first graphical interface. The first data content is stored, so that the first data content can be acquired when the recording application program runs. Collection of the corresponding data content can be achieved in the first graphical interface since the M components are operated directly, thereby making the operation easy and convenient and achieving fast processing on information.

In addition, in the embodiment of the disclosure, the first graphical interface includes M components, and each component may trigger a collection of the data content. After the first data content is collected directly under the first graphical interface, in the case where at least one second data content an attribute parameter of which is different from an attribute parameter of the first data content is collected in response to a triggering operation for at least one other component of the M components that is different from the first component, the first data content and the second data content may be stored as one data record in a corresponding way, so that the first data content and the second data content corresponding to the first data content in the data record can be obtained when the recording application program runs.

In response to triggering operations corresponding to different components, collection of data content having different attribute parameters may be implemented. For example, if the first data content is audio data content, the second data content may be an image or text data content and so on. In this case, the first data content and the second data content may further be stored in a corresponding way to generate one data record. The first data content and the second data content corresponding to the first data content in the data record can be obtained when the recording application program runs, and synchronous output of the first data content and the second data content may be implemented, for example.

The storing the first data content and the second data content in a corresponding way in one data record may be performed after a specified operation triggered by the first graphical interface is received. If the specified operation is not obtained, the data content collected by the input units corresponding to different components may be stored respectively.

In the embodiment of the disclosure, after the collected first data content is stored, at least part of the first data content may be displayed on the second component in the first image interface.

That is, the second component of the M components is a component which may output content. At least part of data content of the collected first data content may be displayed on the second component to prompt the user of the current collected data content and facilitate the user to view the data content, allowing user to collect and output data in the same graphical interface.

For the foregoing methods according to the embodiment, for simplicity, a series of combination of actions are described, but those skilled in the art will understand that, the disclosure is not limited to the order of the described actions, since some steps may be performed in another order or simultaneously according to the disclosure. Furthermore, those skilled in the art will also understand that, the embodiments described in the specification are all preferable embodiments, and the action and module involved are not necessarily required by the disclosure.

Figure 4:
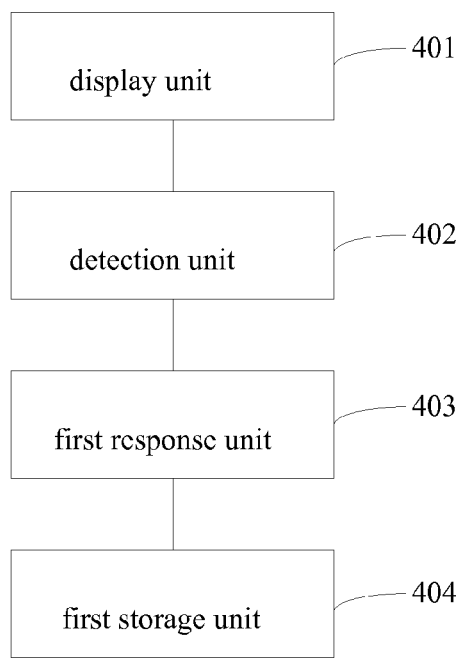
FIG. 4 is a schematic structural diagram of an example of an electronic device provided by an embodiment of the disclosure.

FIG. 4 is a schematic structural diagram of an example of an electronic device provided by an embodiment of the disclosure. The electronic device generates M components to be embedded into a first application program when installing a recording application program, M is an integer greater than or equal to 1. There is an association relationship between the M components and the recording application program.

In the embodiment of the disclosure, the electronic device may install and run multiple application programs. Among others, the electronic device may achieve a function such as data content output by running the recording application program. The recording application program is associated with the M components. The M components may be embedded into the first application program when the recording application program is installed in the electronic device. That is, the M components may be started correspondingly when the first application program runs.

The first application program is an application program which has been installed into the electronic device, and a user interaction interface generally appears when the first application runs. The first application program may be for example a desktop application program, a web browser and a mailbox application program.

In case where the M components are embedded into the first application program, the electronic device may include a display unit 401, detection unit 402, a first response unit 403 and a first storage unit 404.

The display unit 401 is adapted to display a first graphical interface corresponding to the first application program by the display unit when the first application program runs, the first graphical interface including the M components.

When the first application program runs, the M components associated with the recording application program may be started. Therefore the M components, which are able to receive triggering operation from a user, may be output simultaneously in the first graphical interface.

In the embodiment of the disclosure, the component may be a Widget or other application plug-ins.

In one possible implementation, the first application program may be a desktop application program, and the first graphical interface is the desktop of the electronic device. M components are embedded into the desktop application program, so that the M components are output when the desktop is displayed by the electronic device.

The detection unit 402 is adapted to obtain a first triggering operation for a first component of the M components.

The first response unit 403 is adapted to collect, in response to the first triggering operation obtained by the detection unit, first data content under the first graphical interface directly.

The first response unit being adapted to collect first data content under the first graphical interface directly may include the first response unit being adapted to collect first data content and keep at least part of the display content of the first graphical interface unchanged.

The display content in the first graphical interface also includes the M components.

Therefore, the collection of the first data content may be achieved if only the first triggering operation is performed on the first component, so that there is no need for multiple complicated operation steps, thereby achieving a fast collection operation.

There are various implementations for the collected first data content, which may be audio data content, video data content, image data content and/or text data content. In addition, there are many implementations for the collection.

In one possible implementation, the electronic device may further include K input units, The K input units have a one-to-one correspondence with the K components of the M components, K is an integer greater than or equal to 1. In one possible implementation, K is equal to M.

The input unit is adapted to collect data content, which may include audio data content, image data content, text data content and so on. Accordingly, the input unit may be an audio collection unit, an image collection unit, a text collection unit and so on. In practice, the audio collection unit may be a microphone of the electronic device, the image collection unit may be a camera of the electronic device, and the text collection unit may be a keyboard of the electronic device. In a touch-screen electronic device, the text collection unit may further be a virtual keyboard.

The first response unit 403 may be adapted to call, in response to the first triggering operation, a first input unit of the K input units that corresponds to the first component to collect first data content under the first graphical interface directly.

The collecting first data content under the first graphical interface directly may include collecting the first data content and keeping at least part of the display content of the first graphical interface unchanged.

In another implementation, the first response unit 403 may be adapted to collect, in response to the first triggering operation, first data content of display content in the first graphical interface.

When first data content is collected from the display content in the first graphical interface, the display content in the first graphical interface may be kept unchanged, or at least part of the display content is kept unchanged.

The first storage unit 404 is adapted to store the collected first data content, so that the first data content can be obtained when the recording application program runs.

After the first data content is collected directly under the first graphical interface, the first data content may be stored in the electronic device, or may be stored in a network server by triggering the electronic device to establish a connection with the network server.

The first data content can be obtained when the recording application program runs, thereby output or other process and so on are achieved.

In the embodiment, the M components associated with the recording application program in the electronic device are embedded into the first application program. When the first application program runs, a first graphical interface displayed by a display unit includes the M components, thereby a user may perform a triggering operation for the M components in the first graphical interface. In a case where a first triggering operation for a first component of the M components is detected, in response to the first triggering operation, first data content is collected directly under the first graphical interface, and the first data content is stored, so that the first data content can be acquired when the recording application program runs. Collection of the corresponding data content can be achieved in the first graphical interface since the M components are operated directly, and there is no need to start other user interaction interfaces, thereby making the operation easy and convenient and achieving fast processing on information.

Figure 5:
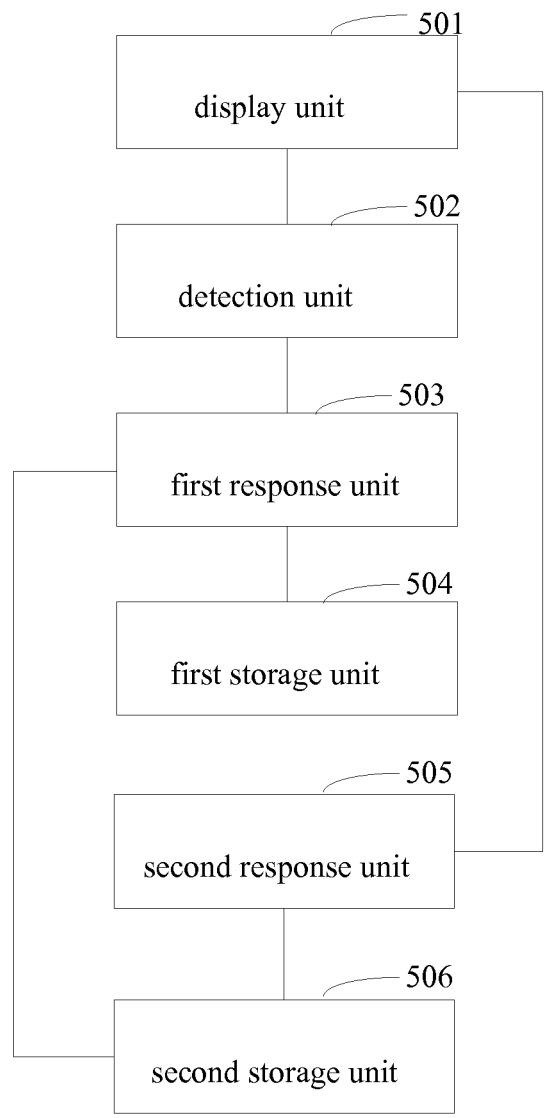
FIG. 5 is a schematic structural diagram of another example of an electronic device provided by an embodiment of the disclosure.

FIG. 5 is a schematic structural diagram of another example of an electronic device provided by an embodiment of the disclosure. The electronic device generates M components to be embedded into a first application program when installing a recording application program, M is an integer greater than or equal to 1. There is an association relationship between the M components and the recording application program, and in a case where the M components are embedded into the first application program, the electronic device may include a display unit 501, a detection unit 502, a first response unit 503, a first storage unit 504, a second response unit 505 and a second storage unit 506.

The display unit 501 is adapted to display a first graphical interface corresponding to the first application program by the display unit when the first application program runs, the first graphical interface including the M components.

The detection unit 502 is adapted to obtain a first triggering operation for a first component of the M components.

The first response unit 503 is adapted to collect, in response to the first triggering operation, first data content under the first graphical interface directly.

In one implementation, the electronic device may further include K input units. The K input units have a one-to-one correspondence with the K components of the M components. K is an integer greater than or equal to 1. In one possible implementation, K is equal to M.

The input unit is adapted to collect data content, which may include audio data content, image data content, text data content and so on. Accordingly, the input unit may be an audio collection unit, an image collection unit, a text collection unit and so on. In practice, the audio collection unit may be a microphone of the electronic device, the image collection unit may be a camera of the electronic device, and the text collection unit may be a keyboard of the electronic device. In a touch-screen electronic device, the text collection unit may further be a virtual keyboard.

The first response unit 403 may be adapted to call, in response to the first triggering operation, a first input unit of the K input units that corresponds to the first component to collect first data content under the first graphical interface directly.

The collecting first data content in the first graphical interface directly may include collecting the first data content and keeping at least part of the display content of the first graphical interface unchanged.

In another implementation, the first response unit 403 may be adapted to collect, in response to the first triggering operation, first data content of display content in the first graphical interface.

When first data content is collected from the display content in the first graphical interface, the display content in the first graphical interface may be kept unchanged, or at least part of the display content may be kept unchanged.

The first storage unit 504 is adapted to store the collected first data content, so that the first data content can be obtained when the recording application program runs.

The second response unit 505 is adapted to collect, in response to a triggering operation for at least one other component of the M components that is different from the first component, at least one second data content an attribute parameter of which is different from an attribute parameter of the first data content.

The second storage unit 506 is adapted to store the first data content and the at least one second data content as one data record in a corresponding way, so that the first data content and the at least one second data content corresponding to the first data content in the data record can be obtained when the recording application program runs.

In response to triggering operations for different components, collection of data content having different attribute parameters may be implemented. In this case, the first data content and the second data content may further be stored in a corresponding way to generate one data record. The first data content and the second data content corresponding to the first data content in the data record can be obtained when the recording application program runs, and synchronous output of the first data content and the second data content may be implemented, for example.

The storing the first data content and the second data content in a corresponding way as one data record may be performed after a specified operation triggered by the first graphical interface is received. If the specified operation is not obtained, the data content collected by the input units corresponding to different components may be stored respectively.

In one possible implementation, in the case where it is detected that at least one second data content an attribute parameter of which is different from an attribute parameter of the first data content is collected for a triggering operation for at least one other component of the M components that is different from the first component, the first data content and the second data content are stored in a corresponding way as one data record, meanwhile, the first data content stored in the first storage unit may be deleted. In case where it is not detected that at least one second data content an attribute parameter of which is different from an attribute parameter of the first data content is collected for a triggering operation for at least one other component of the M components that is different from the first component, only the first data content is stored as one data record.

In addition, after the electronic device stores the collected first data content, at least part of the first data content may be displayed on the second component in the first image interface.

That is, the second component of the M components is a component which may output content. At least part of data content of the collected first data content may be displayed on the second component to prompt the user of the current collected data content and facilitate the user to view the data content, allowing user to collect and output data in the same graphical interface.

Figure 6:
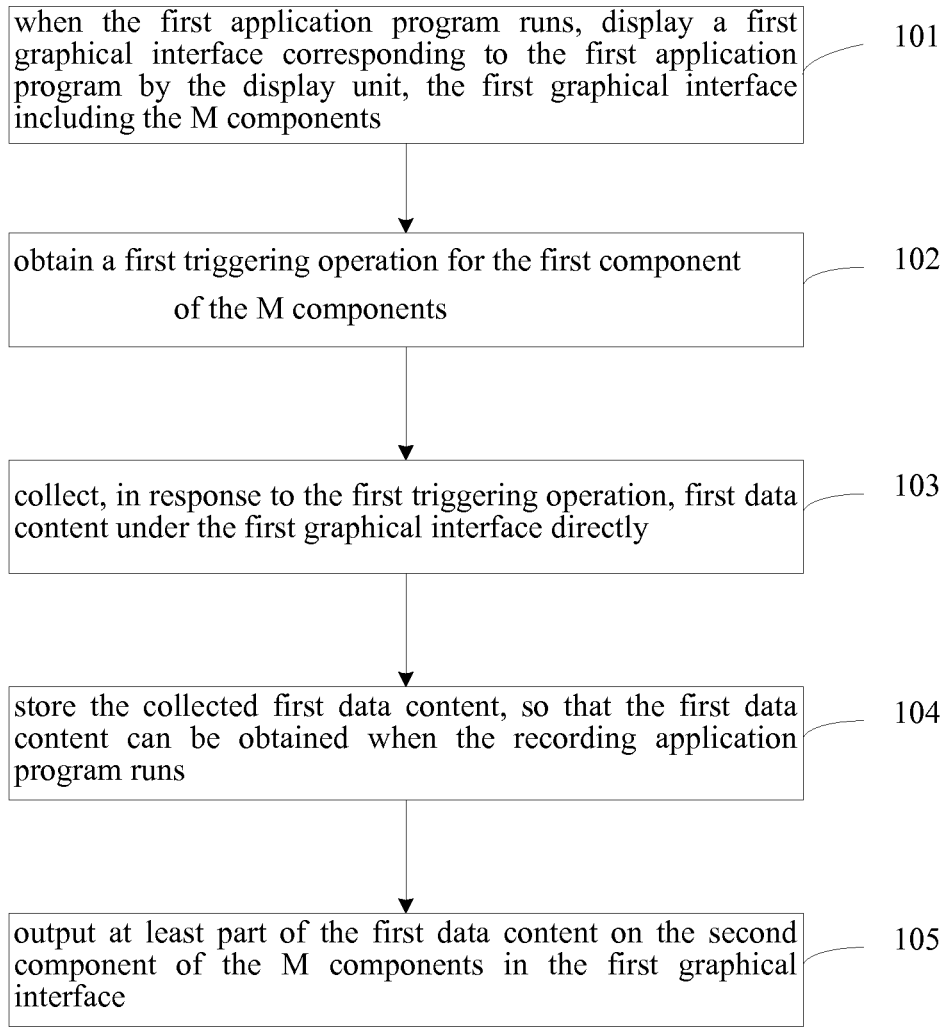
FIG. 6 is a flow chart of an example of an information processing method provided by an embodiment of the disclosure.

FIG. 6 is a flow chart of an example of an information processing method provided by an embodiment of the disclosure. The method is applied to an electronic device. The electronic device generates M components to be embedded into a first application program when installing a recording application program, M is an integer greater than or equal to 1. There is an association relationship between the M components and the recording application program.

In the embodiment of the disclosure, the electronic device may install and run multiple application programs. Among others, the electronic device may achieve a function such as data content output by running the recording application program. The recording application program is associated with the M components. The M components may be embedded into the first application program when the recording application program is installed in the electronic device. That is, the M components may be started correspondingly when the first application program runs.

The first application program is an application program which has been installed into the electronic device, and a user interaction interface generally appears when the first application runs. The first application program may be for example a desktop application program, a web browser and a mailbox application program.

In case where the M components are embedded into the first application program, the method device may include Step 101 to Step 105.

Step 101: when the first application program runs, displaying a first graphical interface corresponding to the first application program by the display unit, the first graphical interface including the M components.

The first graphical interface is a visual user interaction interface output when the first application program runs.

When the first application program runs, the M components associated with the recording application program may be started. Therefore the M components, which are able to receive triggering operation from a user, may be output simultaneously in the first graphical interface.

In the embodiment of the disclosure, the component may be a Widget or other application plug-ins.

Step 102: obtaining a first triggering operation for a first component of the M components.

The first component may include any component of the M components. The first triggering operation may be a click operation, a sliding operation or a specific gesture touch or touch-control operation performed on the first component.

Step 103: collecting, in response to the first triggering operation, first data content under the first graphical interface directly.

The system may collect first data content in response to the first triggering operation.

The collecting first data content under the first graphical interface directly may include keeping at least part of the display content of the first graphical interface unchanged, and at the same time, collecting the first data content.

Alternatively, the collection interface may be displayed at the display position corresponding to at least part of the display content in the first graphical interface.

The display content in the first graphical interface includes the M components.

There are various implementations for the collected first data content, which may be audio data content, video data content, image data content and/or text data content. In addition, there are many implementations for the collection, which will be introduced in detail in the following embodiment.

Step 104: storing the collected first data content, so that the first data content can be obtained when the recording application program runs.

After the first data content is collected directly under the first graphical interface, the first data content may be stored in the electronic device, or may be stored in a network server by triggering the electronic device to establish a connection with the network server.

When the recording application program runs, the first data content may be acquired, thereby implement of output or other process may be achieved.

Step 105: outputting at least part of the first data content on the second component of the M components in the first graphical interface.

In the embodiment of the disclosure, the first data content is collected directly under the first graphical interface, and at least part of the first data content is output on the second component in the first graphical interface directly. Thereby, the user is prompt and at least part of information of the first data content may be obtain quickly based on at least part of data content of the second component, facilitating the information transmission. Therefore, the user may collect and output data in the same graphical interface.

The first data content may be stored as one data record. Therefore, the data content output on the second component may further include at least part of data content corresponding to multiple data records respectively. The multiple data records may output the corresponding at least part of data content dynamically on the second component in chronological order, alternatively, the output may be performed by switching among at least part of the data content of the multiple data records based on the operation of the user. For example, when a triggering operation for a second component is acquired, the current output data content on the second component may be updated in response to the triggering operation for the second component, specifically, another stored data record may be acquired and the data content output currently may be replaced with at least part of data content of the other data record.

The first data content may be audio data content, text data content or image data content and so on.

At least part of the first data content may be key data extracted by analyzing the first data content, or only data corresponding to any part of the first data content, or all the first data content. For example, for the image data content, it may be a thumbnail thereof.

In the embodiment, the M components associated with the recording application program in the electronic device are embedded into the first application program. When the first application program runs, a first graphical interface displayed by a display unit includes the M components, thereby a user may perform a triggering operation for the M components in the first graphical interface. In a case where a first triggering operation for a first component of the M components is detected, in response to the first triggering operation, first data content is collected directly under the first graphical interface, and the first data content is stored, so that the first data content can be acquired when the recording application program runs. Collection of the corresponding data content can be achieved in the first graphical interface since the M components are operated directly, and there is no need to start other user interaction interfaces, thereby making the operation easy and convenient and achieving fast processing on information.

Figure 7:
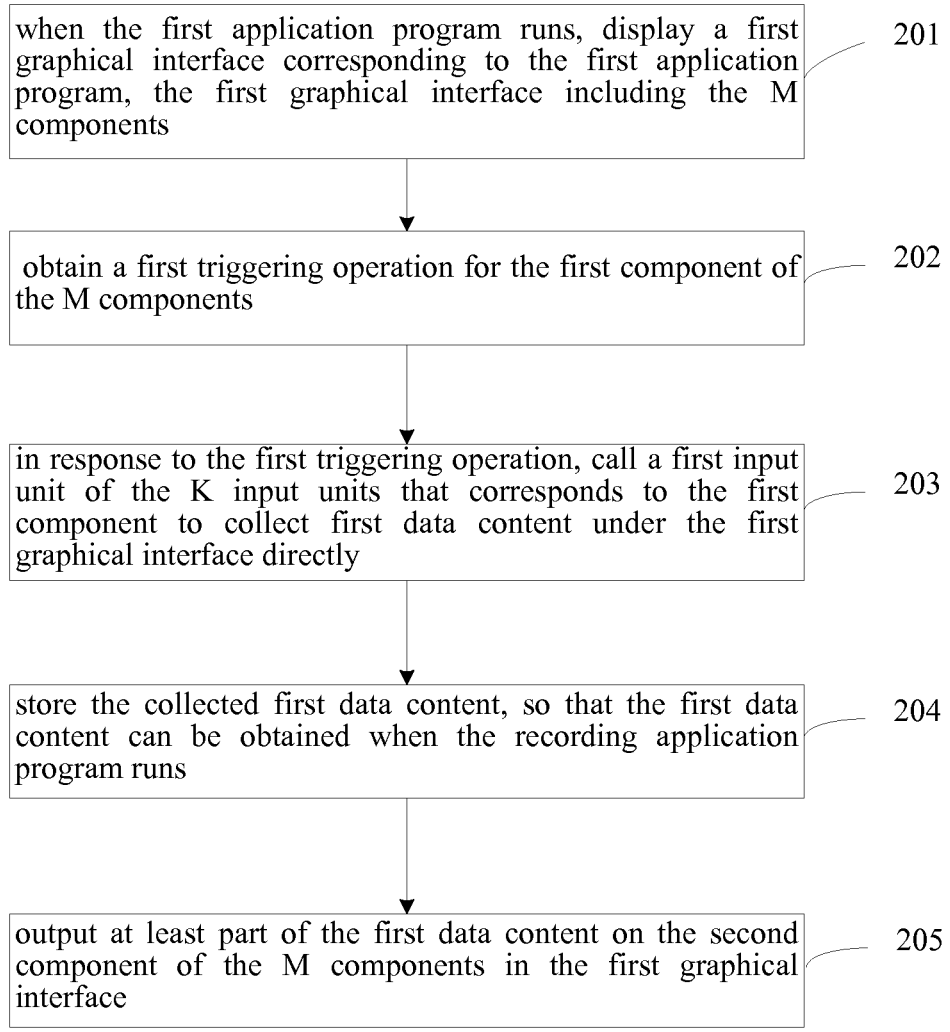
FIG. 7 is a flow chart of another example of an information processing method provided by an embodiment of the disclosure.

FIG. 7 is a flow chart of another example of an information processing method provided by an embodiment of the disclosure. The method is applied to an electronic device. The electronic device includes a display unit. The electronic device generates M components to be embedded into a first application program when installing a recording application program. M is an integer greater than and equal to 1. There is an association relationship between the M components and the recording application program.

In the embodiment of the disclosure, the electronic device may install and run multiple application programs. Among others, the electronic device may achieve a function such as data content output by running the recording application program. The recording application program is associated with the M components. The M components may be embedded into the first application program when the recording application program is installed in the electronic device. That is, the M components may be started correspondingly when the first application program runs.

The first application program may be, for example, a desktop application program, a web browser, a mailbox application program.

In the embodiment, the electronic device may further include K input units, wherein K is an integer greater than or equal to 1. The K input units have a one-to-one correspondence with the K components of the M components. In one possible implementation, K is equal to M.

The input unit is adapted to collect data content, which may include audio data content, image data content, text data content and so on. Accordingly, the input unit may be an audio collection unit, an image collection unit, a text collection unit and so on. In practice, the audio collection unit may be a microphone of the electronic device, the image collection unit may be a camera of the electronic device, and the text collection unit may be a keyboard of the electronic device. In a touch-screen electronic device, the text collection unit may also be a virtual keyboard.

In case where the M components are embedded into the first application program, the method may include Step 201 to Step 204.

Step 201: when the first application program runs, displaying a first graphical interface corresponding to the first application program by the display unit, the first graphical interface including the M components.

Step 202: obtaining a first triggering operation for a first component of the M components.

Step 203: in response to the first triggering operation, calling a first input unit of the K input units that corresponds to the first component to collect first data content under the first graphical interface directly.

In response to the first triggering operation, the first data content of the first input unit corresponding to the first component may be started. At the same time, at least part of the display content in the first graphical interface is kept unchanged.

Figure 7A:
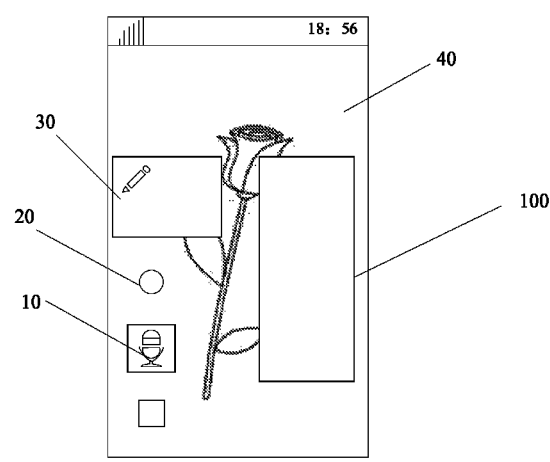
FIG. 7a is a schematic display image of a first graphical interface for an electronic device in an embodiment of the disclosure.
Figure 7B:
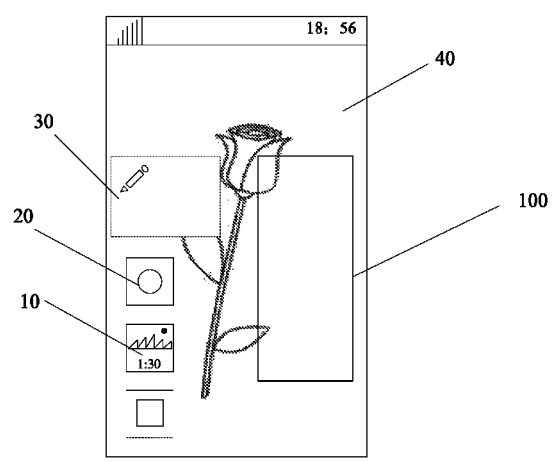
FIG. 7b is another schematic display image of the first graphical interface for an electronic device in an embodiment of the disclosure.
Figure 7C:
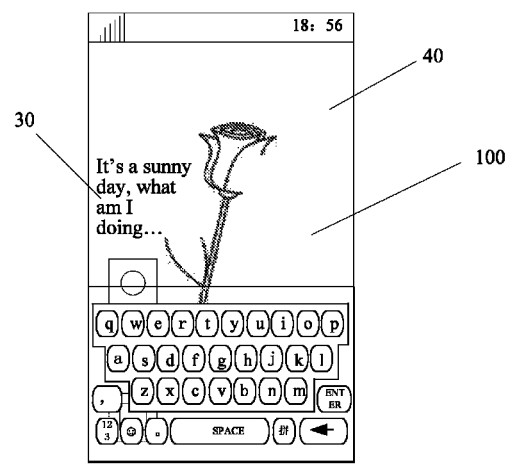
FIG. 7c is yet another schematic display image of the first graphical interface for an electronic device in an embodiment of the disclosure.
Figure 7D:
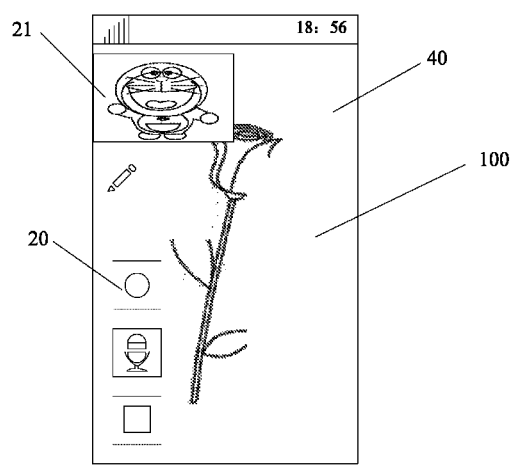
FIG. 7d is yet another schematic display image of the first graphical interface for an electronic device in an embodiment of the disclosure.

FIG. 7a is a schematic display image of a first graphical interface in an embodiment of the disclosure. FIG. 7b is another schematic display image of a first graphical interface in an embodiment of the disclosure. FIG. 7c is yet another schematic display image of a first graphical interface in an embodiment of the disclosure. FIG. 7d is yet another schematic display image of a first graphical interface in an embodiment of the disclosure.

FIG. 7a is a schematic display image of a first graphical interface in an embodiment of the disclosure, the first graphical interface includes M components, and data content is not collected at this moment. The M components may be an audio component 10 for triggering a collection of audio data content, an image component 20 for triggering a collection of image data content and a text component 30 for triggering a collection of text data content and so on.

As illustrated in FIG. 7a, output content 40 of the first application program is displayed in the first graphical interface in addition to M components.

In addition, it should be noted that display positions of the M components in the first graphical interface are not defined in the disclosure, and FIG. 7a to FIG. 7d are only one possible implementation. The electronic device may further update the display positions of the M components in the first graphical interface based on the moving operation of each component by a user, or transform the display positions of the M components based on the current state of the electronic device, such as whether to collect the data content.

FIG. 7b to FIG. 7d are schematic display images of a first graphical interface when the first component is operated to collect the first data content.

In FIG. 7b, the first component is an audio component 10, audio data content may be collected by calling an audio collection unit corresponding to the audio component 10. As illustrated in FIG. 7b, at least part of the display content of the first graphical interface may be kept unchanged when the audio data content is collected. At the same time, the corresponding identifier may be set on the audio component to prompt the user that the audio data content is being collected. The display state may be recovered from FIG. 7b to FIG. 7a after the audio data content collection is completed.

In FIG. 7c, the first component is an image component 20, the image data content may be collected by calling the image collection unit corresponding to the image component 20. As illustrated in FIG. 7c, a collection region 21 of the image collection unit is displayed at a position where at least part of the display content in the first graphical interface is located. The collection region 21 is in an image preview state and may display the collected image in real time.

In FIG. 7d, the first component is a text component 30, the text data content may be collected by calling the text collection unit corresponding to the text component 30. As illustrated in FIG. 7c, at least part of the display content in a first graphical interface may be kept unchanged. The text data content may be collected by calling the text collection unit corresponding to the text component 30. The text collection unit 31 is displayed in the first graphical interface in a case where the text collection unit is a virtual keyboard. The text data content may be input by the text collection unit 31; and the input text data content may be displayed in the text component 30 at the same time. Of course, a text region for displaying the text data content collected by the text collection unit in real time may further be displayed in a position where at least part of the display content in the first graphical interface is located. As illustrated in FIG. 7d, the text data content may be collected directly while the at least part of the display content in the first graphical interface is kept unchanged, i.e., the first graphical interface is still displayed, thereby a quick triggering operation may be implemented. The display state may be recovered from FIG. 7b to FIG. 7a after the text data content collection is completed.

Step 204: storing the collected first data content, so that the first data content can be obtained when the recording application program runs.

The first data content may be stored after the first data content collection is completed.

The storing the first data content may include: obtaining a second triggering operation for the first component, and storing the first data content collected by the first input unit in response to the second triggering operation.

As illustrated in FIG. 7c, the image currently collected in real time may be stored by operating the image component again.

Of course, the storing the first data content may also be implemented by responding to a triggering operation for other operation region in the current first graphical interface.

For example, in FIG. 7d, during collecting the first data content, file data displayed in the text component may be stored by touching a saving control 21 included in the text component 20.

Step 205: outputting at least part of the first data content in a second component of the M components in the first graphical interface.

The outputting at least part of the first data content may include: obtaining stored first data content and displaying at least part of the first data content on the second component.

Figure 7E:
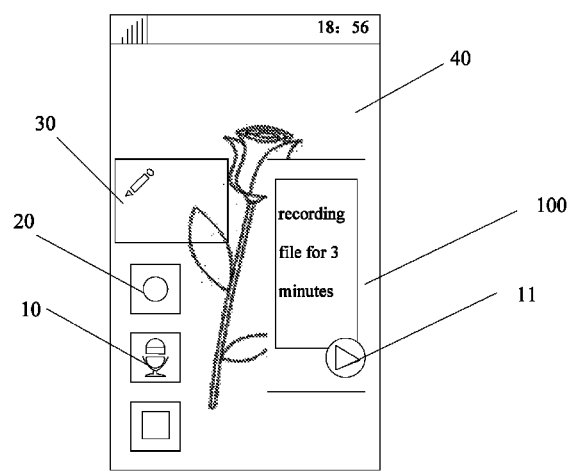
FIG. 7e is yet another schematic display image of the first graphical interface for an electronic device in an embodiment of the disclosure.
Figure 7F:
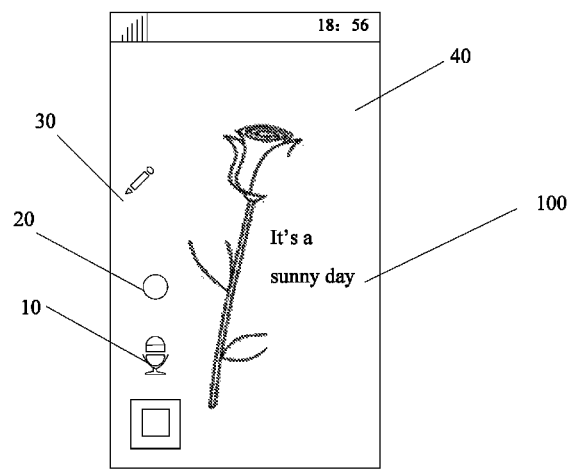
FIG. 7f is yet another schematic display image of the first graphical interface for an electronic device in an embodiment of the disclosure.
Figure 7G:
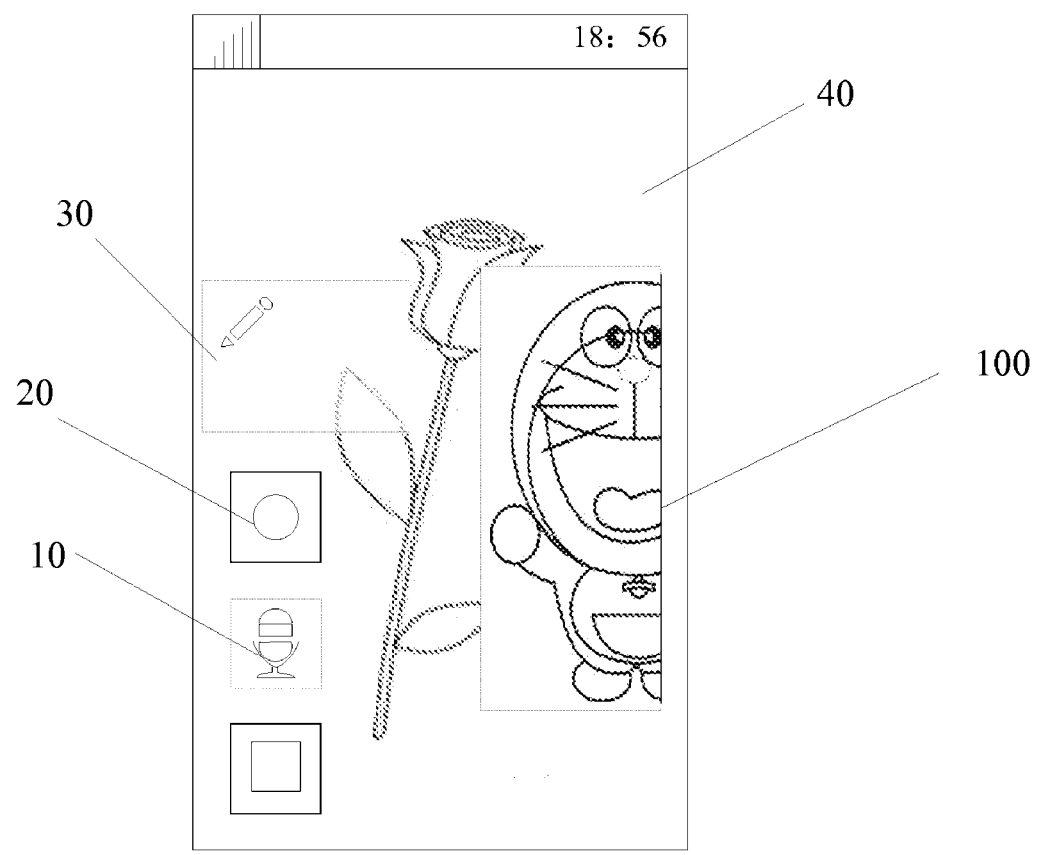
FIG. 7g is yet another schematic display image of the first graphical interface for an electronic device in an embodiment of the disclosure.

For example, FIG. 7e to FIG. 7g correspond to the schematic display images when at least part of the first data content is outputted on the second component 100 of the first graphical interface in FIG. 7b to FIG. 7d respectively.

In a case where the first data content is video data content, an operational button 11 is displayed on the second component. At least part of the audio data content may be displayed in the first graphical interface by operating the operational button. Prompt information corresponding to the audio data content is also displayed at the same time. For example the prompt information may be "a recording file for 3 minutes".

When at least part of the first data content is outputted on the second component, the first data content may also be displayed completely by calling the recording application program for a triggering operation of a user to at least part of the first data content outputted on the second component.

In the embodiment, the M components associated with the recording application in the electronic device are embedded into the first application program. When the first application program runs, a first graphical interface displayed by a display unit includes the M components, thereby a user may perform a triggering operation for the M components in the first graphical interface. In a case where a first triggering operation for a first component of the M components is detected, in response to the first triggering operation, the first data content may be collected by calling the first input unit corresponding to the first component, while at least part of the display content in the first graphical interface is kept unchanged, thus collection of the corresponding data content may be achieved in the first graphical interface directly. The first data content is stored, and at least part of the first data content is outputted on the second component of the first graphical interface, so that the collection and output of the data may be implemented in one graphical interface, thereby facilitating information review and information transmission. Therefore, steps for the electronic device may be reduced, facilitating improvement of the performance of the electronic device.

Figure 8:
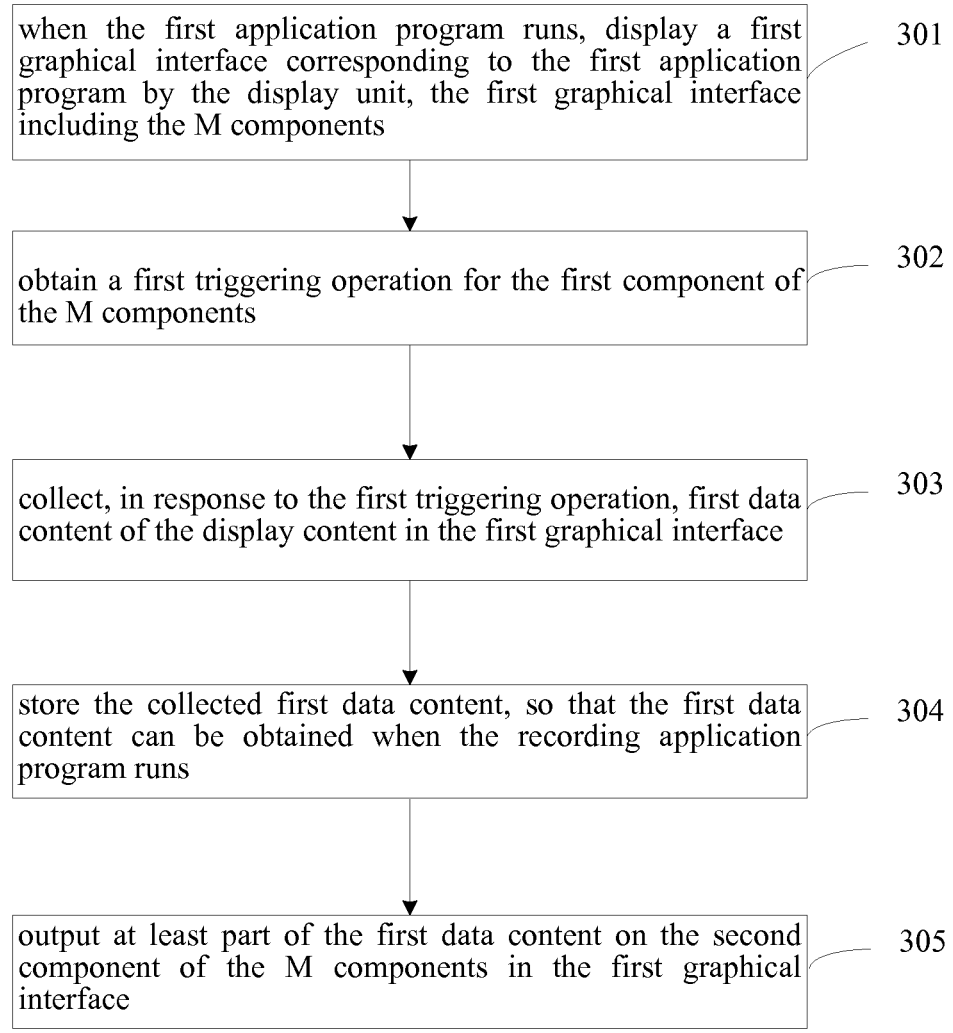
FIG. 8 is a flow chart of yet another example of an information processing method provided by an embodiment of the disclosure.

FIG. 8 is a flow chart of yet another example of an information processing method provided by an embodiment of the disclosure.

The method is applied to an electronic device. The electronic device includes a display unit. The electronic device generates M components to be embedded into a first application program when installing a recording application program. M is an integer greater than or equal to 1. There is an association relationship between the M components and the recording application program.

In the embodiment of the disclosure, the electronic device may install and run multiple application programs. Among others, the electronic device may achieve a function such as data content output by running the recording application program. The recording application program is associated with the M components. The M components may be embedded into the first application program when the recording application program is installed in the electronic device. That is, the M components may be started correspondingly when the first application program runs.

The first application program may be, for example, a desktop application program, a web browser, a mailbox application program.

In case where the M components are embedded into the first application program, the method may include Step 301 to Step 304.

Step 301: when the first application program runs, displaying a first graphical interface corresponding to the first application program by the display unit, the first graphical interface including the M components.

Step 302: obtaining a first triggering operation for a first component of the M components.

Step 303: collecting, in response to the first triggering operation, first data content of the display content in the first graphical interface.

When the first data content of the display content in the first graphical interface is collected, the display content in the first graphical interface may be kept unchanged, or at least part of the display content may be kept unchanged.

The display content in the first graphical interface may include text data content, image data content, audio data content, video data content and so on. Accordingly, the first data content may be text data content, image data content, audio data content, video data content and so on included in the data content, or data content corresponding to the predetermined region in the first graphical interface.

There are many ways to collect the first data content of the display content in the first graphical interface. For example, in case of text or image data content, the first data content may be collected by acquiring a data content in the first graphical interface and analyzing and recognizing the text or image data content and so on included in the data content; and in case of audio or video data content, the first data content may be acquired from the storage unit which stores the audio or video data content.

Step 304: storing the collected first data content, so that the first data content can be obtained when the recording application program runs.

Step 305: outputting at least part of the first data content on the second component of the M components in the first graphical interface.

Figure 8A:
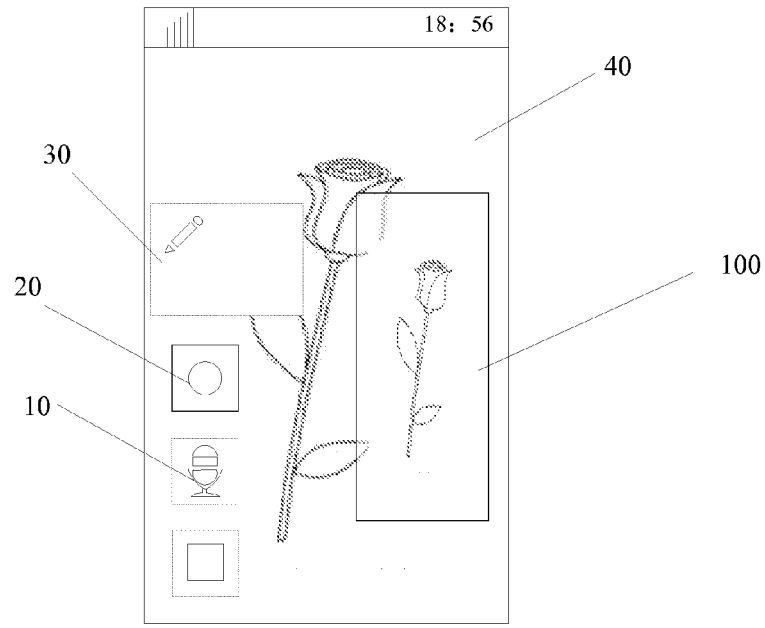
FIG. 8a is yet another schematic display image of a first graphical interface for an electronic device in an embodiment of the disclosure.

FIG. 8a is a schematic display image of the first graphical interface when at least part of the current collected first data content is displayed on the second component 100.

In the embodiment, the M components associated with the recording application program in the electronic device are embedded into the first application program. When the first application program runs, a first graphical interface displayed by a display unit includes the M components, thereby a user may perform a triggering operation for the M components in the first graphical interface. In a case where a first triggering operation for a first component of the M components is detected, in response to the first triggering operation, the first data content of the display content in the first graphical interface may be collected, so that the first data content may be collected directly under the first graphical interface. The first data content is stored, so that the first data content can be acquired when the recording application runs. At least part of the first data content is outputted on the second component of the first graphical interface, so that the collection and output of the data may be implemented in one graphical interface, thereby facilitating information review and information transmission. Therefore, steps for the electronic device may be reduced, facilitating improvement of the performance of the electronic device.

In addition, in the embodiment of the disclosure, the first graphical interface includes M components, and each component may trigger a collection of the data content. After the first data content is collected directly under the first graphical interface, in the case where at least one second data content an attribute parameter of which is different from an attribute parameter of the first data content is collected in response to a triggering operation for at least one other component of the M components that is different from the first component, the first data content and the second data content may be stored as one data record in a corresponding way, so that the first data content and the second data content corresponding to the first data content in the data record can be obtained when the recording application program runs.

In response to triggering operations corresponding to different components, collection of data content having different attribute parameters may be implemented. For example, if the first data content is audio data content, the second data content may be an image or text data content and so on. In this case, the first data content and the second data content may further be stored in a corresponding way to generate one data record. The first data content and the second data content corresponding to the first data content in the data record can be obtained when the recording application program runs, and synchronous output of the first data content and the second data content may be implemented, for example.

The storing the first data content and the second data content in a corresponding way in one data record may be performed after a specified operation triggered by the first graphical interface is received. If the specified operation is not obtained, the data content collected by the input units corresponding to different components may be stored respectively.

At this time, at least part of data content of the data record may be outputted on the second component of the M components in the first graphical interface. For example, in a case where it may be determined that different attribute parameters are included in the data record according to key information extracted from the content of the data record, at least part of data content of the data record may include at least part of the data content of each or part of data of the attribute parameters respectively.

In a case where multiple data records are stored, at least part of record content of each data record is outputted on the second component dynamically; or in a case where only at least part of record content of one data record is outputted, a prompt information is outputted, and according to the prompt information, a user may perform an operation of switching the current output data record such that the current output data record may be switched to another data record and at least part of record content of the another data record is outputted on the second component. There are various ways to select the another data record, specifically, a data record different from the current data record may be selected randomly, or a data record that is stored after the current data record in a storage order.

For the foregoing methods according to the embodiment, for simplicity, a series of combination of actions are described, but those skilled in the art will understand that, the disclosure is not limited to the order of the described actions, since some steps may be performed in another order or simultaneously according to the disclosure. Furthermore, those skilled in the art will also understand that, the embodiments described in the specification are all preferable embodiments, and the action and module involved are not necessarily required by the disclosure.

Figure 9:
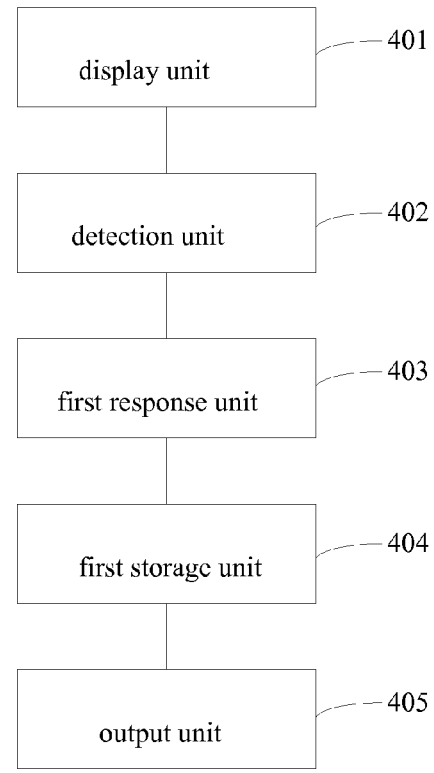
FIG. 9 is a schematic structural diagram of an example of an electronic device provided by an embodiment of the disclosure.

FIG. 9 is a schematic structural diagram of another example of an electronic device provided by an embodiment of the disclosure. The electronic device generates M components to be embedded into a first application program when installing a recording application program, M is an integer greater than or equal to 1. There is an association relationship between the M components and the recording application program.

In the embodiment of the disclosure, the electronic device may install and run multiple application programs. Among others, the electronic device may achieve a function such as data content output by running the recording application program. The recording application program is associated with the M components. The M components may be embedded into the first application program when the recording application program is installed in the electronic device. That is, the M components may be started correspondingly when the first application program runs.

The first application program is an application program which has been installed into the electronic device, and a user interaction interface generally appears when the first application runs. The first application program may be for example a desktop application program, a web browser and a mailbox application program.

In case where the M components are embedded into the first application program, the electronic device may include a display unit 401, detection unit 402, a first response unit 403, a first storage unit 404 and an output unit 405.

The display unit 401 is adapted to display a first graphical interface corresponding to the first application program by the display unit when the first application program runs, the first graphical interface including the M components.

When the first application program runs, the M components associated with the recording application program may be started. Therefore the M components, which are able to receive triggering operation from a user, may be output simultaneously in the first graphical interface.

In the embodiment of the disclosure, the component may be a Widget or other application plug-ins.

In one possible implementation, the first application program may be a desktop application program, and the first graphical interface is the desktop of the electronic device. M components are embedded into the desktop application program, so that the M components are output when the desktop is displayed by the electronic device.

The detection unit 402 is adapted to obtain a first triggering operation for a first component of the M components.

The first response unit 403 is adapted to collect, in response to the first triggering operation obtained by the detection unit, first data content under the first graphical interface directly.

The first response unit being adapted to collect first data content under the first graphical interface directly may include the first response unit being adapted to collect first data content and keep at least part of the display content of the first graphical interface unchanged.

The display content in the first graphical interface also includes the M components.

Therefore, the collection of the first data content may be achieved if only the first triggering operation is performed on the first component, so that there is no need for multiple complicated operation steps, thereby achieving a fast collection operation.

There are various implementations for the collected first data content, which may be audio data content, video data content, image data content and/or text data content. In addition, there are many implementations for the collection.

In one possible implementation, the electronic device may further include K input units, The K input units have a one-to-one correspondence with the K components of the M components. K is an integer greater than or equal to 1. In one possible implementation, K is equal to M.

The input unit is adapted to collect data content, which may include audio data content, image data content, text data content and so on. Accordingly, the input unit may be an audio collection unit, an image collection unit, a text collection unit and so on. In practice, the audio collection unit may be a microphone of the electronic device, the image collection unit may be a camera of the electronic device, and the text collection unit may be a keyboard of the electronic device. In a touch-screen electronic device, the text collection unit may further be a virtual keyboard.

The first response unit 403 may be adapted to call, in response to the first triggering operation, a first input unit of the K input units that corresponds to the first component to collect first data content under the first graphical interface directly.

The collecting first data content under the first graphical interface directly may include collecting the first data content and keeping at least part of the display content of the first graphical interface unchanged.

In another implementation, the first response unit 403 may be adapted to collect, in response to the first triggering operation, first data content of display content in the first graphical interface.

When first data content is collected from the display content in the first graphical interface, the display content in the first graphical interface may be kept unchanged, or at least part of the display content is kept unchanged.

The first storage unit 404 is adapted to store the collected first data content, so that the first data content can be obtained when the recording application program runs.

After the first data content is collected directly under the first graphical interface, the first data content may be stored in the electronic device, or may be stored in a network server by triggering the electronic device to establish a connection with the network server.

The first data content can be obtained when the recording application program runs, thereby output or other process and so on are achieved.

The output unit 405 is adapted to output at least part of the first data content on the second component of the M components in the first graphical interface.

In the embodiment, the M components associated with the recording application program in the electronic device are embedded into the first application program. When the first application program runs, a first graphical interface displayed by a display unit includes the M components, thereby a user may perform a triggering operation for the M components in the first graphical interface. In a case where a first triggering operation for a first component of the M components is detected, in response to the first triggering operation, first data content is collected directly under the first graphical interface, and the first data content is stored, so that the first data content can be acquired when the recording application program runs. At least part of the first data content is outputted on the second component of the first graphical interface, so that the collection and output of the data may be implemented in one graphical interface, thereby facilitating information review and information transmission. Therefore, steps for the electronic device may be reduced, facilitating improvement of the performance of the electronic device.

Figure 10:
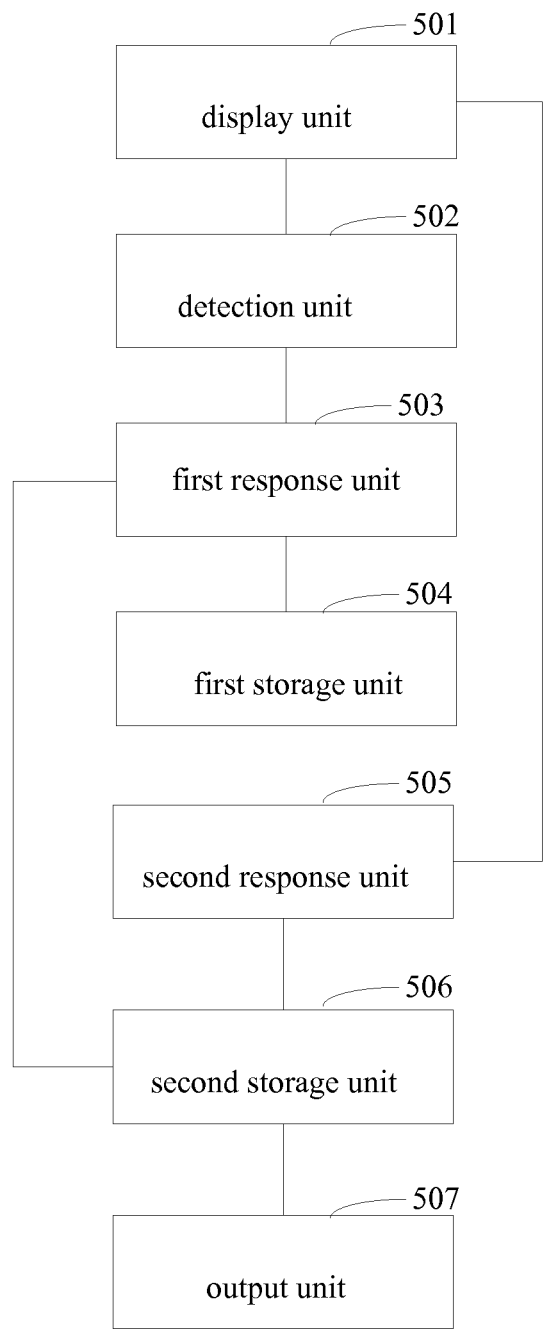
FIG. 10 is a schematic structural diagram of another example of an electronic device provided by an embodiment of the disclosure.

FIG. 10 is a schematic structural diagram of another example of an electronic device provided by an embodiment of the disclosure. The electronic device generates M components to be embedded into a first application program when installing a recording application program, M is an integer greater than or equal to 1. There is an association relationship between the M components and the recording application program, and in a case where the M components are embedded into the first application program, the electronic device may include a display unit 501, a detection unit 502, a first response unit 503, a first storage unit 504, a second response unit 505, a second storage unit 506 and an output unit 507.

The display unit 501 is adapted to display a first graphical interface corresponding to the first application program by the display unit when the first application program runs, the first graphical interface including the M components.

The detection unit 502 is adapted to obtain a first triggering operation for a first component of the M components.

The first response unit 503 is adapted to collect, in response to the first triggering operation, first data content under the first graphical interface directly.

In one possible implementation, the electronic device may further include K input units. The K input units have a one-to-one correspondence with the K components of the M components. K is an integer greater than or equal to 1. In one possible implementation, K is equal to M.

The input unit is adapted to collect data content, which may include audio data content, image data content, text data content and so on. Accordingly, the input unit may be an audio collection unit, an image collection unit, a text collection unit and so on. In practice, the audio collection unit may be a microphone of the electronic device, the image collection unit may be a camera of the electronic device, and the text collection unit may be a keyboard of the electronic device. In a touch-screen electronic device, the text collection unit may further be a virtual keyboard.

The first response unit 403 may be adapted to call, in response to the first triggering operation, a first input unit of the K input units that corresponds to the first component to collect first data content under the first graphical interface directly.

The collecting first data content in the first graphical interface directly may include collecting the first data content and keeping at least part of the display content of the first graphical interface unchanged.

In another implementation, the first response unit 403 may be adapted to collect, in response to the first triggering operation, first data content of display content in the first graphical interface.

When first data content is collected from the display content in the first graphical interface, the display content in the first graphical interface may be kept unchanged, or at least part of the display content may be kept unchanged.

The first storage unit 504 is adapted to store the collected first data content, so that the first data content can be obtained when the recording application program runs.

The second response unit 505 is adapted to collect, in response to a triggering operation for at least one other component of the M components that is different from the first component, at least one second data content an attribute parameter of which is different from an attribute parameter of the first data content.

The second storage unit 506 is adapted to store the first data content and the at least one second data content as one data record in a corresponding way, so that the first data content and the at least one second data content corresponding to the first data content in the data record can be obtained when the recording application program runs.

The output unit 507 is adapted to output at least part of the first data content or at least part of the record content of the data record on the second component of the M components in the first graphical interface.

In response to triggering operations for different components, collection of data content having different attribute parameters may be implemented. In this case, the first data content and the second data content may further be stored in a corresponding way to generate one data record. The first data content and the second data content corresponding to the first data content in the data record can be obtained when the recording application program runs, and synchronous output of the first data content and the second data content may be implemented, for example.

The storing the first data content and the second data content in a corresponding way as one data record may be performed after a specified operation triggered by the first graphical interface is received. If the specified operation is not obtained, the data content collected by the input units corresponding to different components may be stored respectively.

In one possible implementation, in the case where it is detected that at least one second data content an attribute parameter of which is different from an attribute parameter of the first data content is collected for a triggering operation for at least one other component of the M components that is different from the first component, the first data content and the second data content are stored in a corresponding way as one data record, meanwhile, the first data content stored in the first storage unit may be deleted. In case where it is not detected that at least one second data content an attribute parameter of which is different from an attribute parameter of the first data content is collected for a triggering operation for at least one other component of the M components that is different from the first component, only the first data content is stored as one data record.

In the embodiment, the M components associated with the recording application program in the electronic device are embedded into the first application program. When the first application program runs, a first graphical interface displayed by a display unit includes the M components, thereby a user may perform a triggering operation for the M components in the first graphical interface. In a case where a first triggering operation for a first component of the M components is detected, in response to the first triggering operation, the first data content of the display content in the first graphical interface may be collected, so that the first data content may be collected directly under the first graphical interface. The first data content is stored, so that the first data content can be acquired when the recording application runs. Collection of the corresponding data content can be achieved in the first graphical interface since the M components are operated directly thereby making the operation easy and convenient and achieving fast processing on information. At least part of the first data content is outputted on the second component of the first graphical interface, so that the collection and output of the data may be implemented in one graphical interface, thereby facilitating information review and information transmission. Therefore, steps for the electronic device may be reduced, facilitating improvement of the performance of the electronic device.

In the following, embodiments of the disclosure may be described in detail in conjunction with the accompany drawings.

Figure 11:
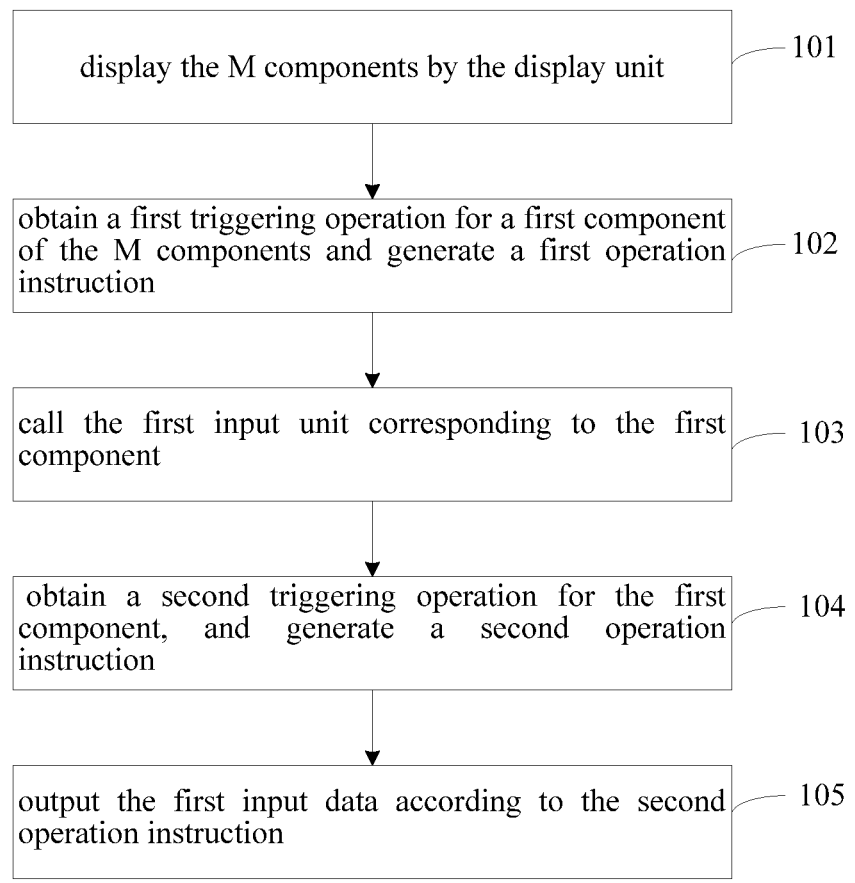
FIG. 11 is a flow chart of an example of an information processing method provided by an embodiment of the disclosure.

FIG. 11 is a flow chart of an example of an information processing method provided by an embodiment of the disclosure. The technical solution of the embodiment of the disclosure is adapted to an electronic device. The electronic device includes a display unit and M input units, M is an integer greater than and equal to 1.

Various types of data are collected by the M input units.

The method may include step 101 to step 105.

Step 101: displaying the M components by the display unit, the M components having a one-to-one correspondence with M input units.

The electronic device may display the M components by the display unit when the e receiving a calling instruction.

In an implementation, the M components may be included in an operation interface in a case where an application is started up in the electronic device and the operation interface of the application is displayed in the display interface.

The M components have a one-to-one correspondence with M input units. The input unit may be called by operating respective component.

Step 102: obtaining a first triggering operation for a first component of the M components and generate a first operation instruction.

The first component may be anyone of the M components which is selected by a user.

In the embodiment, the first triggering operation may be a clicking operation, a sliding operation or a custom gesture operation performed by a user in the display region of the first component in the display unit. The clicking operation may include a single-click operation which clicks once during a predetermined period of time, and a double-click operation which clicks twice during a predetermined period of time.

Step 103: calling the first input unit corresponding to the first component.

The first input unit is adapted to collect first input data.

The first input unit corresponding to the first component may be called by performing the first operation instruction.

The first input unit may collect the first input data by calling the first input unit.

The first input unit may be an image collection unit, an audio collection unit or a text collection unit, and so on.

The image data may be collected by calling the image collection unit if the first input unit is the image collection unit.

The audio data may be collected by calling the audio collection unit if the first input unit is the audio collection unit.

The text data may be collected by calling the text collection unit if the first input unit is the text collection unit.

Step 104: obtaining a second triggering operation for the first component, and generating a second operation instruction; the first triggering operation being the same as the second triggering operation.

The second triggering operation is a same triggering operation as the first triggering operation, and may be a sliding operation or a double-click operation.

Because the second triggering operation is the same as the first triggering operation, the operation instruction generated by the first triggering operation and the operation instruction generated by the second triggering operation may be distinguished according to whether the first input unit is called to collect the first input data. If the triggering operation is obtained before the first input unit is called, it is confirmed that it is the first triggering operation and a first operation instruction is generated; and if the triggering operation is obtained after the first input unit is called, it is confirmed that it is the second triggering operation and a second operation instruction different from the first operation instruction is generated.

The operation instruction generated by the first triggering operation and the operation instruction generated by the second triggering operation may also be distinguished by adopting a method for example whether the operation position of the first triggering operation on the first component is different from the operation position of the second triggering operation on the first component. The first component has a certain operation region in the display interface, and triggering operations at different operation positions in the operation region may also trigger different operation instructions.

Step 105: outputting the first input data according to the second operation instruction.

The first input data collected by the first input unit may be outputted by executing the second operation instruction.

In practice, the user may collect the first input data by operating the first component to call the first input unit. After being collected by the first input unit, the first input data may be outputted by the operating the first component. The collection and output of the first input data may be implemented by the operating a same component, making the operation easy and fast.

In the embodiment, the first triggering operation for the first component is obtained and the first operation instruction is generated, the first input unit is called to collect the first input data. The second triggering operation for the first component is obtained and the second operation instruction is generated. Therefore, different control operations for the electronic device are implemented by operating a same component, making the operation easy and fast and facilitating the information processing.

Figure 12:
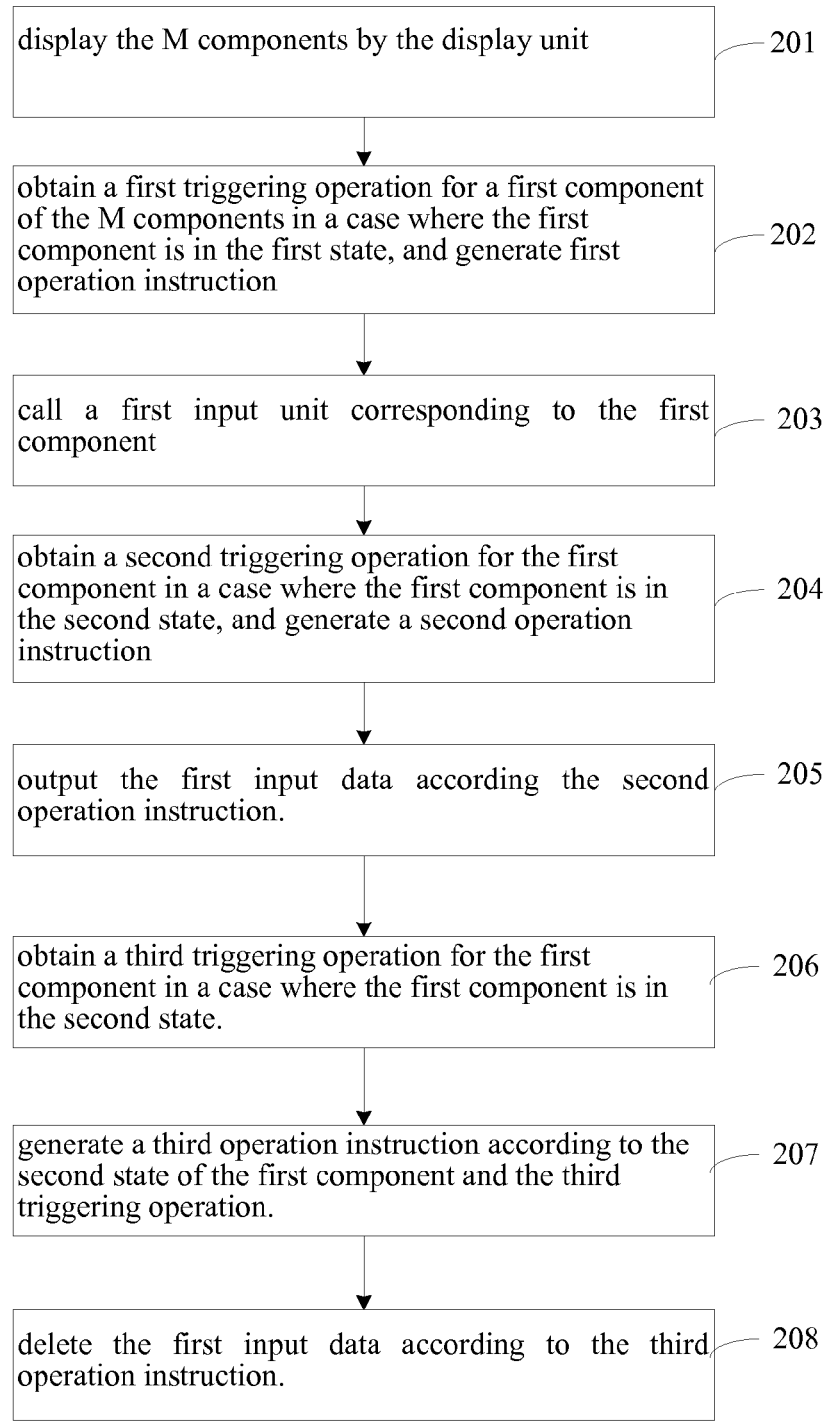
FIG. 12 is a flow chart of another example of an information processing method provided by an embodiment of the disclosure.

FIG. 12 is a flow chart of another example of an information processing method provided by an embodiment of the disclosure, the technical solution according the embodiment of the disclosure is applied to an electronic device, the electronic device includes a display unit and M input units, wherein M is an integer greater than or equal to 1.

The M input units may be adapted to collect different types of data respectively.

The method may include steps 201 to 205.

201: displaying the M components by the display unit, the M components having a one-to-one correspondence with M input units.

In the embodiment, the first component has a first state and a second state.

The first state and the second state may be switched with each other.

The first state may be an initial state of the first component when the M components are display on the electronic device by the display unit.

The second state may be a process state when different information process is performed by operating the first component.

If the first component is in different states, the generated operation instructions may be different when the triggering operation for the first component is obtained.

202: obtaining a first triggering operation for the first component in a case where the first component is in the first state, and generating a first operation instruction according to the first state of the first component.

203: calling a first input unit corresponding to the first component according to the first operation instruction.

The first input unit is adapted to collect the first input data.

In the embodiment, when the first component is in the first state, the first operation instruction is generated in a case where the triggering operation for the first component is the first triggering operation.

The first input unit may be called to collect the first input data by executing the first operation instruction.

204: obtaining a second triggering operation for the first component in a case where the first component is in the second state, and generating a second operation instruction according to the second state of the first component.

205: outputting the first input data according the second operation instruction.

In the embodiment, when the first component is in the second state, the second operation instruction is generated in a case where the triggering operation for the first component is the second triggering operation.

Figure 12A:
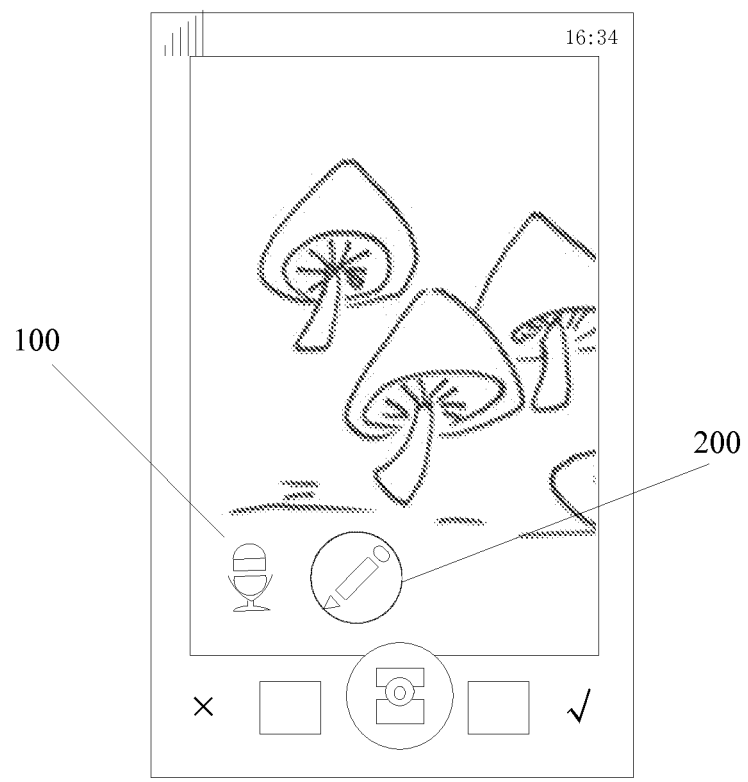
FIG. 12a is a schematic display image of a display interface for an electronic device in an embodiment of the disclosure.

After the first input data is collected by the first input unit, the first input data may be outputted when the second operation instruction is executed For example, referring to FIG. 12a, a schematic display image of a display interface for an electronic device in an embodiment of the disclosure is shown. In this display interface, M components are displayed. In a case where the first component is an audio component 100, the first input unit corresponding to the first component is an audio collection unit, in FIG. 2a, the audio component 100 is in the first state. When the first triggering operation, for example a click-touch operation, is performed on the audio component 100, the audio collection unit may be called to collect audio data.

In a case where the first component is the text component 200, the input unit corresponding to the first component is the text input unit. In FIG. 12a, the text component 200 is in the first state, when the first triggering operation is performed on the text component 200, the text input unit may be called to collect text data.

Figure 12B:
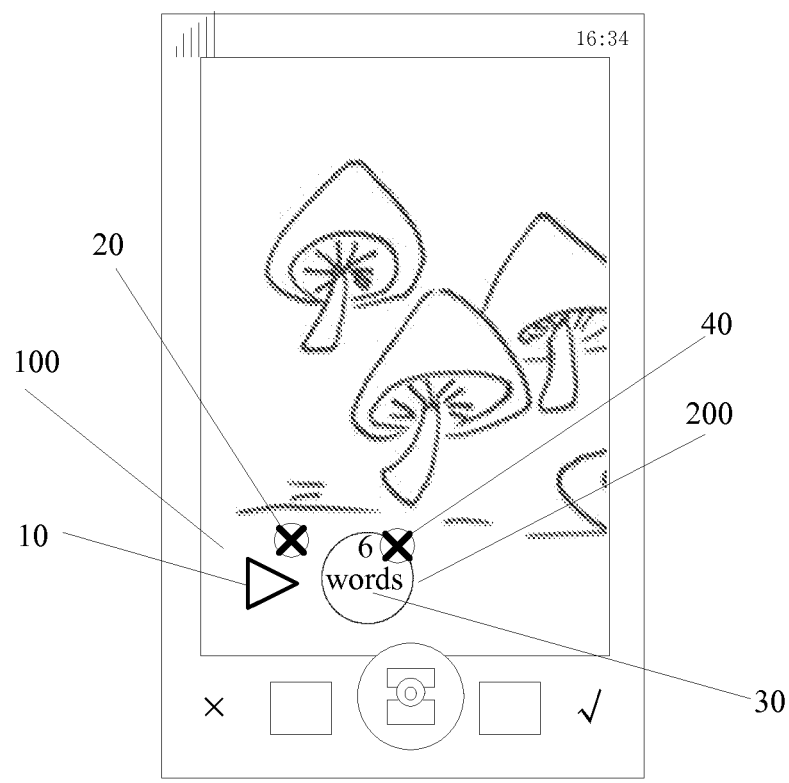
FIG. 12b is another schematic display image of the display interface for an electronic device in an embodiment of the disclosure.

FIG. 12b is another schematic display image of the display interface for an electronic device in an embodiment of the disclosure, and FIG. 12b is a schematic display image showing that the first component in FIG. 12a is in the second state. FIG. 12b is a schematic display image showing the second states for the first component which is the audio component 100 or the text component 200 respectively. When the second triggering operation, for example click-touch operation, is performed on the audio component 100 or the text component 200, the audio data collected by the audio collection unit or the text data collected by the text input unit may be outputted.

In a case where the first operation is in the second state, other operation instructions may also be generated to implement the process of the first input data collected by the first input unit, therefore, the method may also include steps 206 and 207.

206: obtaining a third triggering operation for the first component in a case where the first component is in the second state.

207: generating a third operation instruction according to the second state of the first component and the third triggering operation.

Different second operation instructions and different third operation instructions may be generated for the triggering operation for the first component in the first state, and determination of the second operation instruction and the third operation instruction depends on parameters of the triggering operation. The operation of the second triggering operation may be the same as the operation of the third triggering operation. For example, both the second triggering operation and the third triggering operation are single-click operations, and their operation parameters may be different, the operation parameters may include operation position.

In one possible implementation, the first component has a certain operation region, different operation instructions may be triggered in a case where triggering operations at different operation positions of the operation region are performed.

For example, the second operation instruction is triggered in a case where a triggering operation performed at a first operation position of an operation region for the first component is the second triggering operation.

For example, the third operation instruction is triggered in a case where a triggering operation performed at a second operation position of the operation region for the first component is the third triggering operation.

Of course, the operation region is not limited to the first operation region and the second operation region, other operation instructions may be triggered in a case where triggering operations at other operation positions of the operation region for the first component are performed.

Taking FIG. 12b as an example, in a case where the audio component 100 and the text component 200 are in the second state, as shown in FIG. 12b, the operation region for the audio component 100 includes the first operation region 10 and the second operation region 20, and the operation region for the text component 200 includes the first operation region 300 and the second operation region 40. Different operation instructions may be generated when triggering operations for the first component are performed at different operating positions.

208: deleting the first input data according to the third operation instruction.

In the embodiment, the third operation instruction is adapted to delete the first input data. The first triggering operation may be deleted when the third operation instruction is performed.

It is should be noted that, in a case where the first component is in the second state, other triggering operations for the first component are obtained to generate other operation instructions which may be adapted to implement other processing of the first input data, for example, the modification of the first input data or the like.

To bring operation convenience to the user, in a case where the first component is in the first state, different identifiers may also be displayed on the first component to distinguish different states of the first component.

Therefore, a first identifier may be displayed on the first component in a case where the first component is in the first state.

At least one second identifier may be displayed on the first component in a case where the first component is in the second state.

As shown in FIG. 12a and FIG. 12b, different identifiers are displayed on the first component to facilitate the user to distinguish.

In FIG. 12b, two second identifiers are displayed in a case where the first component is in the second state, such as the two second identifiers in the first position and the second position of the audio operation control. The two second identifiers are different, facilitating the user to distinguish and perform corresponding triggering operations to trigger different operation instructions.

The first state and the second state may be switched with each other. In one possible implementation, a first switching instruction may also be generated after the first triggering operation for the first component of the M components is obtained.

According to the first switching instruction, the first component may be controlled to switch from the first state to the second state.

That is, the first switching instruction may also be generated when the first operation instruction is generated, and thereby the first component may be controlled to switch from the first state to the second state.

In the second state, a second switching instruction may also be generated after the second triggering operation for the first component is obtained.

According to the second switching instruction, the first component may be controlled to switch from the second state to the first state.

That is, the second switching instruction may also be generated when the second operation instruction is generated, and thereby the first component may be controlled to switch from the second state to the first state.

Of course, the execution of the first switching instruction or the second switching instruction and the switching between the first state and the second state may at the same time as the execution of the first operation instruction or the second operation instruction, or may be after the execution of the first operation instruction or the second operation instruction. That is, the first switching instruction may be performed by the first input unit after the first input data is collected; and/or the second switching instruction may be performed after the first input data is outputted.

Of course, both the switching from the first state to the second state and the switching from the second state to the first state may be triggered in the way described above, and may also be triggered in other ways.

In the embodiment, the first operation instruction is generated for the first triggering operation for the first component in the first operation state, and the first input unit may be called to collect the first input data. The second operation instruction is generated for the second triggering operation for the first component in the second operation state, and the first input data may be outputted. The third operation instruction is generated for the third triggering operation for the first component in the second operation state, to delete the first input data. Therefore, different control operations for the electronic device are implemented by operating a same component, making the operation easy and fast and facilitating the information processing.

In the embodiment, the first component may have the first state and the second state. Of course, the first component may also have other states, and the first component may be switched between the different states, and in different states. In different states, different identifiers are displayed on the first component, to facilitate the user to distinguish or prompt the user of the state of the first component.

Figure 13:
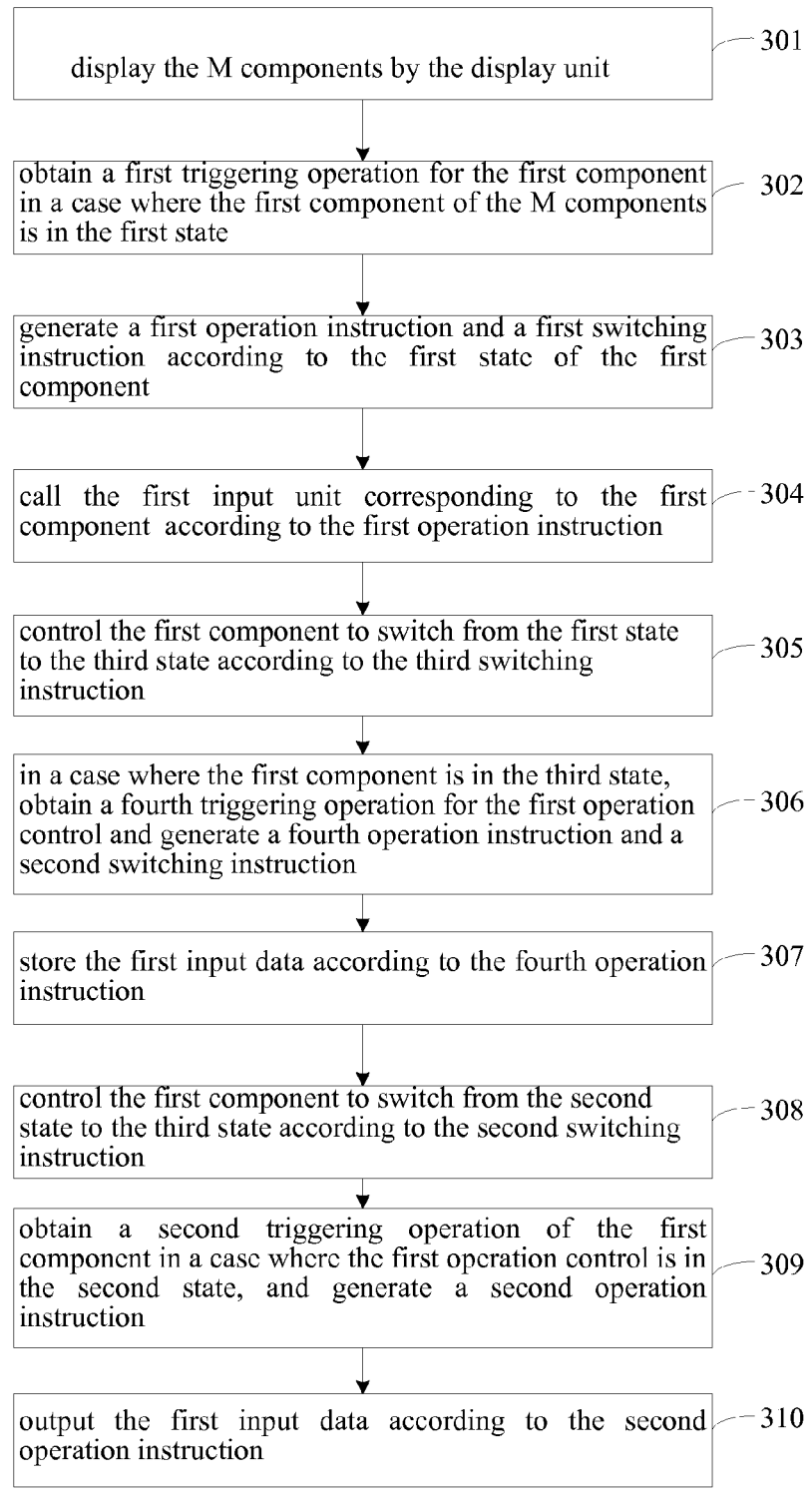
FIG. 13 is a flow chart of yet another example of an information processing method provided by an embodiment of the disclosure.

Combining FIG. 12a and FIG. 12b, it is introduced by taking a case that the first component is an audio control as an example hereinafter, the first component also includes a third state. Reference is made to FIG. 13 which is a flow chart of yet another example of an information processing method provided by an embodiment of the disclosure. The technical solution of the embodiment is applied to the electronic device, and the electronic device includes a display unit and M input units, M is an integer greater than or equal to 1.

The M input units may be adapted to collect different types of data respectively.

The method may include steps 301 to 310.

301: displaying M components by the display unit, the M components having a one-to-one correspondence with the M input units.

302: obtaining a first triggering operation for the first component in a case where the first component of the M components is in the first state.

303: generating a first operation instruction and a first switching instruction according to the first state of the first component.

In the embodiment, a schematic display image of the first component in the first state is shown in FIG. 2a, and the first component is an audio component 100.

A first identifier may also be displayed on the first component.

According to the first triggering operation and the first state of the first component, the first operation instruction and the third switching instruction can be generated.

304: calling the first input unit corresponding to the first component according to the first operation instruction.

The first input unit is adapted to collect a first input data;

305: controlling the first component to switch from the first state to the third state according to the third switching instruction.

Figure 13A:
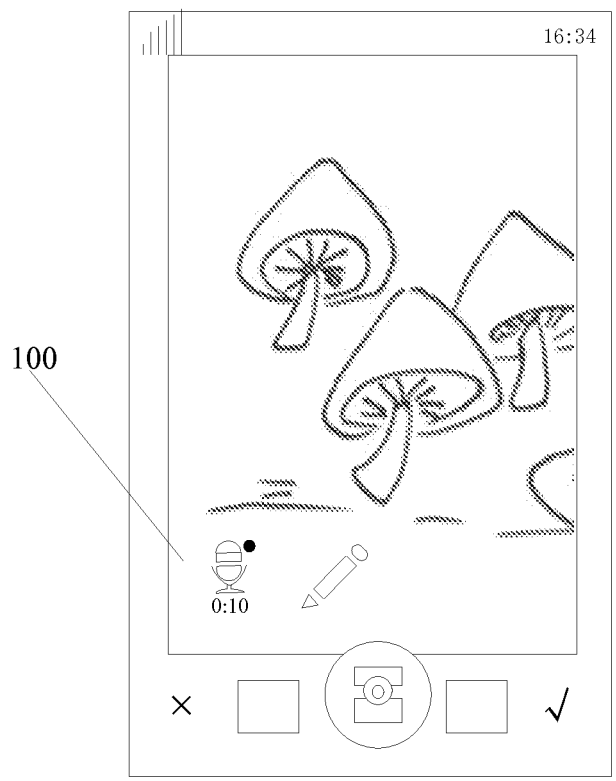
FIG. 13a is yet another schematic display image of a display interface for an electronic device in an embodiment of the disclosure.

In the embodiment, the first component also has a third state, and the third state may indicate a process that the first input unit collects the first input data. The first component may also be in the third state when the first input unit is called to collect the first input data. As shown in FIG. 13a, yet another schematic display image of the first graphical interface for an electronic device in an embodiment of the disclosure is shown, specifically, a schematic display image showing that the audio control 100 in the third state is shown, indicating the audio collection unit corresponding to the audio component is recording a audio data.

In a case where the first component is in the third state, the third identifier may also be displayed on the first component to prompt the user of the state of the first component.

306: in a case where the first component is in the third state, obtain a fourth triggering operation for the first component and generate a fourth operation instruction and a second switching instruction.

307: store the first input data according to the fourth operation instruction.

308: controlling the first component to switch from the second state to the third state according to the second switching instruction.

In a case where the first component is in the third state, if a fourth triggering operation for the first component is obtained, then the fourth operation instruction and the fourth switching instruction may be generated.

The fourth operation instruction is used to instruct the first input unit to stop collecting the first input data. In the embodiment, the electronic device may also include a storage unit, and the storage unit may be a buffer unit. Therefore, according to the fourth operation instruction, the first input data may also be saved, and the first input data can be cached.

Meanwhile, the first component may be controlled to switch to the second state according to the second switching instruction.

309: obtaining a second triggering operation for the first component in a case where the first component is in the second state, and generating a second operation instruction according to the second state of the first component.

310: outputting the first input data according to the second operation instruction.

Specifically, in a case where the first component is in the second state, the third triggering operation for the first component may also be obtained, the third triggering operation can be generated according to the third state of the first component, and the first input data may be deleted according to the third operation instruction.

Further, a fifth switching instruction may also be generated while the second operation instruction is generated, the fifth switching instruction may be used to trigger the first component to switch the second state to the fourth state, and the fourth state is a state when the first input data is outputted. If the first input data has been outputted, the fourth state may also be switched to the second state. Of course, if a fifth triggering operation is received during output of the first input data, the output of the first input data may be paused, while the fourth state is switched to the second state.

A second switching instruction may also be generated while the third operation instruction is generated, the second switching instruction may be used to trigger the first component to switch the second state to the first state.

In the embodiment, the first component having different states, the trigger operation obtained in different states may trigger different operation instructions to perform different operations. Different states of the first component may also be switched. Therefore, different control operations for the electronic device are implemented by operating a same component in different state, making the operation easy and fast and facilitating the information processing.

When the embodiment of the disclosure is applied to a practical application, the electronic device may also include an image collection unit, the displaying the M components by the display unit includes: starting the image collection unit, and displaying the M components by the display unit when the display unit displays an image collected in real time by the image collection unit.

That is, when the electronic device is configured for image collection, the display unit may output the M components so as to call the M input units corresponding to the M components to collect input data. The M input units are different from the image collection units, and thereby different data collection may be implemented. An image collected by the image collection unit and input data collected by the M input units may also be saved as one media record in a corresponding way, therefore the input data collected by the M input units may be outputted correspondingly when the image collected by the image collection unit is outputted.

The process of collecting the input data by the M input units may refer to the information processing method in the embodiment of the disclosure.

For the foregoing methods according to the embodiment, for simplicity, a series of combination of actions are described, but those skilled in the art will understand that, the disclosure is not limited to the order of the described actions, since according to the disclosure, some steps may be performed in another order or simultaneously according to the disclosure. Furthermore, those skilled in the art will also understand that, the embodiments described in the specification are all preferable embodiments, and the action and module involved are not necessarily required by the disclosure.

Figure 14:
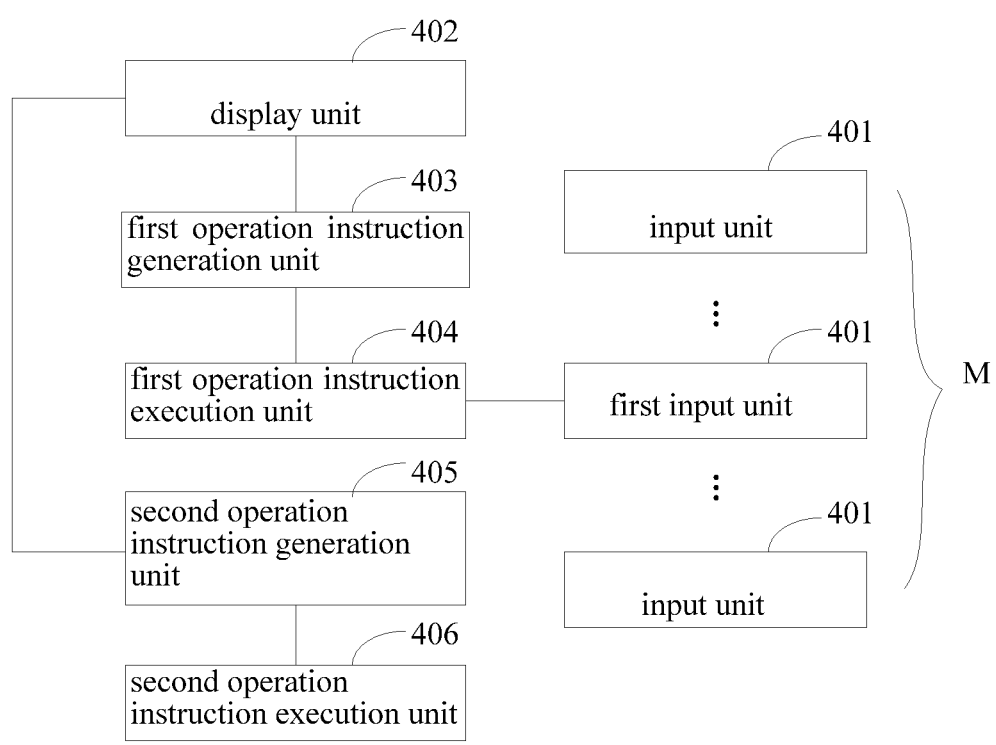
FIG. 14 is a schematic structural diagram of an example of an electronic device provided by an embodiment of the disclosure.

FIG. 14 is a schematic structural diagram of an example of an electronic device provided by an embodiment of the disclosure. The electronic device 401 includes M input units 401, M is an integer greater than or equal to 1, the electronic device may also include a display unit 402, a first operation instruction generation unit 403, first operation instruction execution unit 404, a second operation instruction generation unit 405 and a second operation instruction execution unit 406.

The display unit 402 is adapted to display M components, the M components having a one-to-one correspondence with M input units.

The first operation instruction generation unit 403 is adapted to obtain a first triggering operation for a first component of the M components and generate a first operation instruction.

The first operation instruction execution unit 404 is adapted to call a first input unit corresponding to the first component, the first input unit being adapted to collect first input data.

The second operation instruction generation unit 405 is adapted to obtain a second triggering operation of the first component and generate a second operation instruction.

The first triggering operation is the same as the second triggering operation.

The second operation instruction execution unit 406 is adapted to output the first input data according to the second operation instruction.

The different operation instructions generated by the second triggering operation and by the first triggering operation may be distinguished according to whether the first input unit is called to collect the first input data. If the triggering operation is obtained before the first input unit is called, the first triggering operation may be confirmed and the first operation instruction is generated; and if the triggering operation is obtained after the first input unit is called, the second triggering operation may be confirmed and the second operation instruction different from the first operation instruction is generated.

Of course, other way may also be used to distinguish the operation instruction generated by the first triggering operation and the operation instruction generated by the second triggering operation, for example whether the operation position of the first triggering operation on the first component is different from the operation position of the second triggering operation on the first component. The first component has a certain operation region in the display interface, and triggering operations at different operation positions in the operation region may also trigger different operation instructions.

In the embodiment, a first operation instruction generated by the electronic device for the first triggering operation for the first component may call the first input unit to collect a first input data. A second operation instruction generated by the electronic device for the second triggering operation for the first component may be used to output the first input data. Therefore, different control operations for the electronic device are implemented by operating a same component, making the operation easy and fast and facilitating the information processing.

Figure 15:
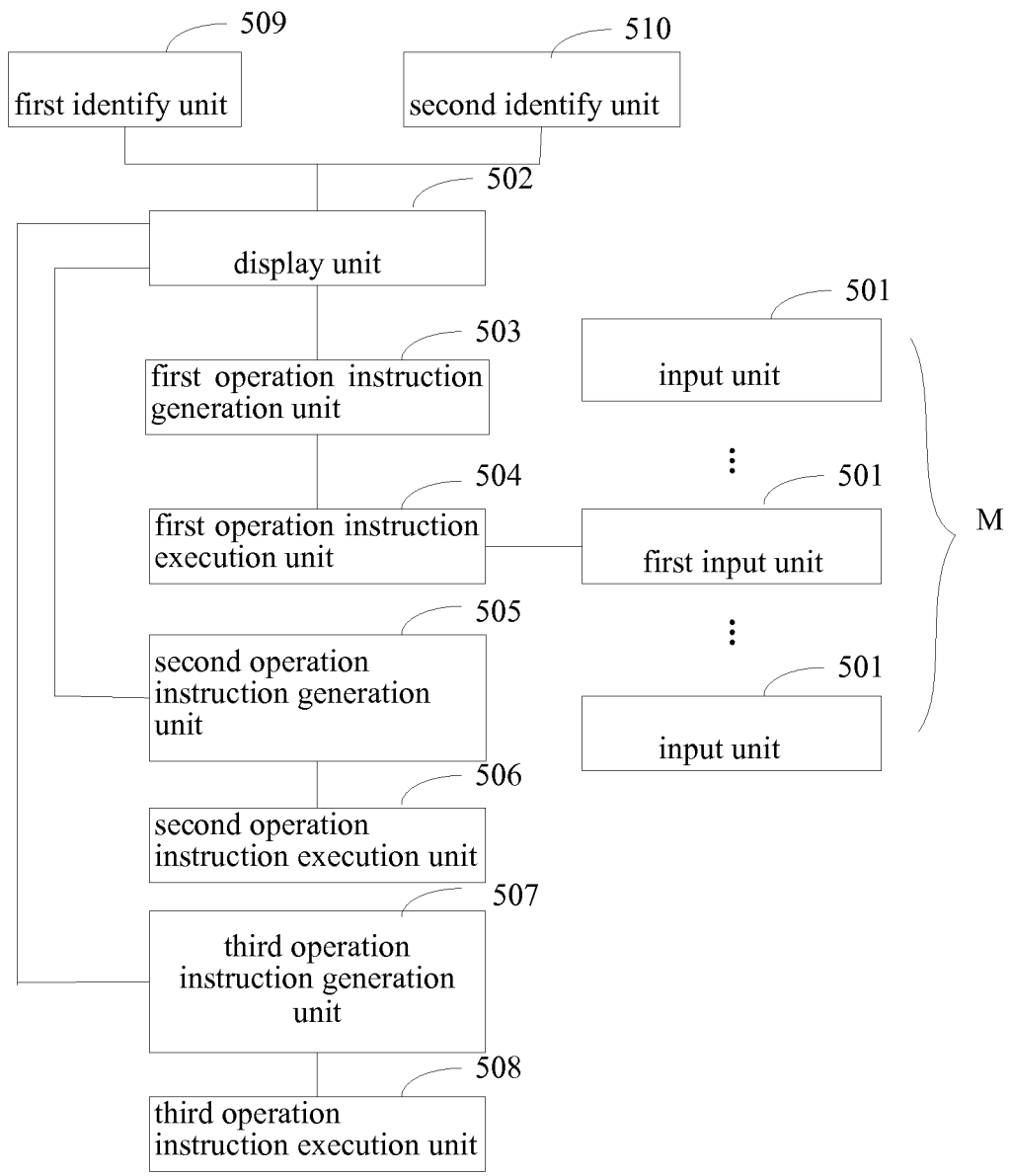
FIG. 15 is a schematic structural diagram of another example of an electronic device provided by an embodiment of the disclosure.

FIG. 15 is a schematic structural diagram of another example of an electronic device provided by an embodiment of the disclosure. The electronic device includes M input units 501, M is an integer greater than or equal to 1, the electronic device may also include a display unit 502, a first operation instruction generation unit 503, a first operation instruction execution unit 504, a second operation instruction generation unit 505 and a second operation instruction execution unit 506.

The display unit 502 is adapted to display the M components, the M components having a one-to-one correspondence with the M input units.

The first operation instruction generation unit 503 is adapted to obtain a first triggering operation for the first component in a case where the first component of the M components is in the first state and generate a first operation instruction according to the first state of the first component.

The first component has a first state and a second state.

The first state and the second state may be switched with each other.

The first state may be an initial state of the first component when the M components are display on the electronic device by the display unit.

The second state may be a process state when different information process is performed by operating the first component.

If the first component is in different states, the generated operation instructions may be different when the triggering operation for the first component is obtained.

The first operation instruction execution unit 504 is adapted to call a first input unit corresponding to the first component.

The first input unit is adapted to collect a first input data.

In the embodiment, when the first component is in the first state, the first operation instruction is generated in a case where the triggering operation for the first component is the first triggering operation.

The first input unit may be called to collect the first input data by executing the first operation instruction.

The second operation instruction generation unit 505 is adapted to obtain a second triggering operation for the first component in a case where the first component is in the second state, and generate a second operation instruction according to the second state of the first component.

The first triggering operation is the same as the second triggering operation;

The second operation instruction execution unit 506 is adapted to output the first input data according to the second operation instruction.

When the first component is in the second state, the first operation instruction is generated in a case where the triggering operation for the first component is the second triggering operation.

The first input data may be outputted if the second operation instruction is executed after the first input data is collected by the first input unit.

In a case where the first operation is in the second state, other operation instructions may also be generated to implement the process of collecting the first input data by the first input unit, therefore, the electronic device may also include a third operation instruction generation unit 507 and a third operation instruction execution unit 508

The third operation instruction generation unit 507 is adapted to obtain a third triggering operation for the first component in a case where the first component is in the second state, and generate a third operation instruction according to the second state of the first component and the third triggering operation.

The third operation instruction execution unit 508 is adapted to delete the first input data according to the third operation instruction.

Different second operation instructions and different third operation instructions may be generated for the triggering operation for the first component in the first state, and the determination of the second operation instruction and the third operation instruction depends on the parameters of the triggering operation. The operation of the second triggering operation may be the same as the operation of the third triggering operation. For example, both the second triggering operation and the third triggering operation are single-click operations, and their operation parameters may be different, the operation parameters may include operation position.

In one possible implementation, the first component has a certain operation region, different operation instructions may be triggered in a case where triggering operations at different operation positions of the operation region are performed.

For example, the second operation instruction is triggered in a case where a triggering operation performed at a first operation position of an operation region for the first component is the second triggering operation.

For example, the third operation instruction is triggered in a case where a triggering operation performed at a second operation position of the operation region for the first component is the third triggering operation.

It is should be noted that, in a case where the first component is in the second state, other triggering operations for the first component are obtained to generate other operation instructions which may be adapted to implement other processing of the first input data, for example, the modification of the first input data or the like.

To bring operation convenience to the user, in a case where the first component is in the first state, different identifiers may also be displayed on the first component to distinguish different states of the first component. Therefore, the electronic device may also include a first identify unit 509 and a second identify unit 510.

The first identify unit 509 is adapted to display a first identifier on the first component in a case where the first component is in the first state.

The second identify unit 510 is adapted to display at least one second identifier on the first component in a case where the first component is in the second state.

The first state and the second state may be switched with each other, therefore, the electronic device may also include a first switching instruction generation unit, a first switching instruction execution unit and/or a second switching instruction generation unit and a second switching instruction execution unit.

The first switching instruction generation unit, adapted to generate a first switching instruction after a first triggering operation for a first component of the M components is obtained.

The first switching instruction execution unit is adapted to control the first component to switch from the first state to the second state according to the first switching instruction generated by the first switching instruction generation unit.

The second switching instruction generation unit is adapted to generate a second switching instruction after a second triggering operation for the first component is obtained.

The second switching instruction execution unit is adapted to control the first component to switch from the second state to the first state according to the second switching instruction generated by the second switching instruction generation unit.

In the embodiment, a first operation instruction generated by the electronic device for the first triggering operation for the first component in the first state may call the first input unit to collect a first input data. A second operation instruction generated by the electronic device for the second triggering operation for the first component in the second state may be used to output the first input data. A third operation instruction may also be generated for the third triggering operation for the first component in the second state to delete the first input data. Therefore, different control operations for the electronic device are implemented by operating a same component, making the operation easy and fast and facilitating the information processing.

Figure 16:
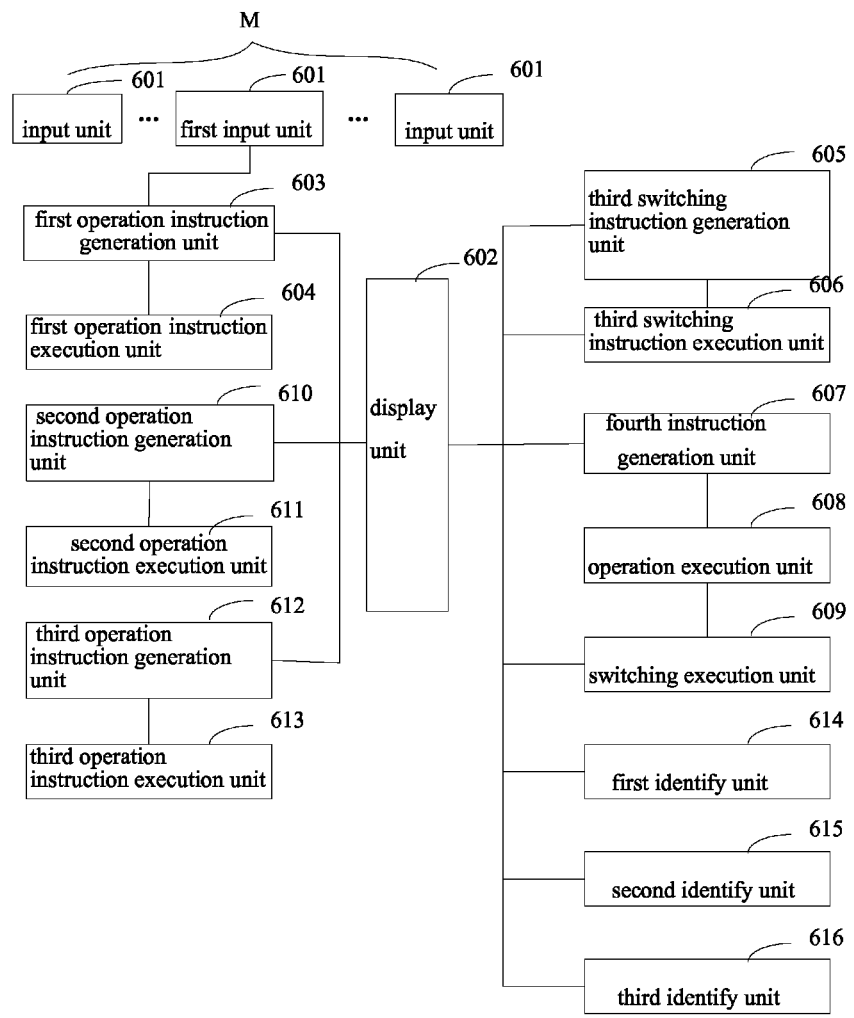
FIG. 16 is a schematic structural diagram of yet another example of an electronic device provided by an embodiment of the disclosure.

FIG. 16 is a schematic structural diagram of yet another example of an electronic device provided by an embodiment of the disclosure, the electronic device includes M input units 601, M is an integer greater than or equal to 1, the electronic device may also include a display unit 602, a first operation instruction generation unit 603, a first operation instruction execution unit 604, a third switching command generation unit 605 and a third switching instruction execution unit 606, a fourth instruction generation unit 607, an operation execution unit 608, a switching execution unit 609, a second operation instruction generation unit 610, a second switching instruction execution unit 611, a third operation instruction generation unit 612 and a third operation instruction execution unit 613.

The display unit 602 is adapted to display the M components, the M components having a one-to-one correspondence with the M input units.

The first operation instruction generation unit 603 is adapted to obtain a first triggering operation of the first component in a case where the first component is in the first state, and generate a first operation instruction according to the first state of the first component.

The first operation instruction execution unit 604 is adapted to call the first component corresponding to the first input unit.

The first input is adapted to collect the first input data.

The third switching command generation unit 605 is adapted to generate a third switching instruction after the first triggering operation for the first component of the M components is obtained.

The third switching instruction execution unit 606 is adapted to control the first component to switch from the first state to the third state according to the third switching instruction.

In the embodiment, it is described by taking a case that the first component is an audio component as an example.

The first component has at least a first state, a second state and a third state.

The third state may indicate a process that a first input unit collects first input data. When the first input unit is called to collect the first input data, the first component may be in the third state.

The fourth instruction generation unit 607 is adapted to obtain a fourth triggering operation for the first component and generate a fourth operation instruction and a fourth switching instruction in a case where the first component is in the third state.

The operation execution unit 608 is adapted to save the first input data according to the fourth operation instruction.

The switching execution unit 609 is adapted to control the first component to switch from the third state to the second state according to the fourth switching instruction.

When the first component is in the third state, if a fourth triggering operation for the first component is obtained, then the fourth operation instruction and the fourth switching instruction may be generated.

The fourth operation instruction is used to instruct the first input unit to stop collecting the first input data. In the embodiment, the electronic device may also include a storage unit, and the storage unit may be a buffer unit. Therefore, according to the fourth operation instruction, the first input data may also be saved, and the first input data can be cached.

Meanwhile, the first component can be controlled to switch to the second state according to the second switching instruction.

The second operation instruction generation unit 610 is adapted to obtain a second triggering operation for the first component in a case where the first component is in the second state and generate a second operation instruction according to the second of the first component.

The first triggering operation is the same as the second triggering operation.

The second operation instruction execution unit 611 is adapted to output the first input data according to the second operation instruction.

The third operation instruction generation unit 612 is adapted to obtain a third triggering operation for the first component in a case where the first component is in the second state, and generate a third operation instruction according to the second state of the first component and the third triggering operation.

The third operation instruction execution unit 613 is adapted to delete the first input data according to the third operation instruction.

A fifth switching instruction may also be generated while the second operation instruction is generated, the fifth switching instruction may be used to trigger the first component to switch the second state to the fourth state, and the fourth state is a state when the first input data is outputted. If the first input data has been outputted, the fourth state may also be switched to the second state. Of course, if a fifth triggering operation is received during output of the first input data, the output of the first input data may be paused, while the fourth state is switched to the second state.

A second switching instruction may also be generated while the third operation instruction is generated, the second switching instruction may be used to trigger the first component to switch the second state to the first state.

When the first manipulation control is in different states, different identifiers may also be set to distinguish different states, therefore, the electronic device may also include a first identify unit 614, a second identify unit 615 and a third identify unit 616.

The first identify unit 614 is adapted to display a first identifier on the first component in a case where the first component is in the first state.

The second identify unit 615 is adapted to display at least one third identifier on the first component in a case where the first component is in the second state.

The third identify unit 616, adapted to display a third identifier on the first component in a case where the first component is in the third state.

In the embodiment, the first component having different states, the trigger operation obtained in different states may trigger different operation instructions to perform different operations. Different states of the first component may also be switched. Therefore, different control operations for the electronic device are implemented by operating a same component in different state, making the operation easy and fast and facilitating the information processing.

When the embodiment of the disclosure is applied to a practical application, the electronic device may also include an image collection unit, the displaying the M components by the display unit includes: starting the image collection unit, and displaying the M components by the display unit when the display unit displays an image collected in real time by the image collection unit.

That is, when the electronic device is configured for image collection, the display unit may output the M components so as to call the M input units corresponding to the M components to collect input data. The M input units are different from the image collection units, and thereby different data collection may be implemented. An image collected by the image collection unit and input data collected by the M input units may also be saved as one media record in a corresponding way, therefore the input data collected by the M input units may be outputted correspondingly when the image collected by the image collection unit is outputted.

The embodiments of the disclosure are described herein in a progressive manner, with the emphasis of each of the embodiments on the difference between it and the other embodiments; hence, for the same or similar parts between the embodiments, one can refer to the other embodiments. For the apparatus disclosed in the embodiment, the description thereof is relatively simple since the apparatus corresponds to the method disclosed in the embodiment, and the relevant portion may refer to the description of method.

It should be noted that, herein, a relationship term such as "a first" and "a second" is only used to distinguish one entity or operation from another entity or operation, but does not necessarily require or imply that there is such actual relationship or order between these entities or operations. Moreover, the term "comprising", "including" or any other variant thereof are intended to cover a non-exclusive inclusion, so that a process, method, article or device including a series of elements not only includes those elements but also includes other elements which are not explicitly listed, or also includes inherent elements for such process, method, article or device. In the case there is no more restriction, the element defined by the statement "includes a . . . " does not exclude that there is other same element in the process, method, article or device including said element.

For convenient description, various functional units of the above device are described respectively. Practically, the functions of the various units may be implemented in one or multiple software and/or hardware for implementing the disclosure.

As can be seen from the above description of the embodiments, it can be understood clearly by those skilled in the art that the disclosure can be implemented by means of software in addition to necessary common hardware platform. Based on such understanding, the part of the technical solution of the disclosure that is in essential or contributes to the convention can be embodied in software product, which can be stored in the storage medium, such as a ROM/RAM, a magnetic disk, and an optical disk, and include several instructions adapted to cause a computer device (such as a personal computer, a server, or a network device) to implement the method described in all or some of the embodiments of the disclosure.

Those skilled in the art are able to perform or apply the disclosure according to the above description of the disclosed embodiment. It is apparent for those skilled in the art to modify the embodiments in many ways. The general principle suggested by the application can be performed in other embodiments without departing from the spirit or scope of the disclosure. Therefore, the disclosure should not be limited by these embodiments shown in this application, but conform to the widest scope in accordance with the principle and the novelty disclosed in the disclosure.

The invention claimed is:

1. An information processing method applied to an electronic device, wherein the electronic device generates M components to be embedded into a first application program when installing a recording application program, M is an integer greater than or equal to 1, there is an association relationship between the M components and the recording application program, and in a case where the M components are embedded into the first application program, and the M components further have a one-to-one correspondence with M input units comprised in the electronic device, the method comprising:

when the first application program runs, displaying a first graphical interface corresponding to the first application program by the electronic device, the first graphical interface comprising the M components;

obtaining a first triggering operation for a first component of the M components, the first component having a first state and a second state, in a case where the first component is in the first state, generating a first operation instruction according to the first state of the first component;

calling a first input unit corresponding to the first component to collect with the first input unit, in response to the first triggering operation, first data content under the first graphical interface directly;

obtaining a second triggering operation for the first component in a case where the first component is in the second state, and generating a second operation instruction according to the second state of the first component, the first triggering operation being the same as the second triggering operation; and outputting the first input data according to the second operation instruction; and storing the collected first data content, so that the first data content can be obtained when the recording application program runs.

2. The method according to claim 1, the collecting, in response to the first triggering operation, first data content under the first graphical interface directly comprises:

in response to the first triggering operation, calling a first input unit of the K input units that corresponds to the first component to collect first data content under the first graphical interface directly.

3. The method according to claim 1, wherein the collecting, in response to the first triggering operation, first data content under the first graphical interface directly comprises:

collecting, in response to the first triggering operation, first data content of display content in the first graphical interface.

4. The method according to claim 1, wherein the collecting, in response to the first triggering operation, first data content under the first graphical interface directly comprises:

in response to the first triggering operation, collecting first data content and keeping at least part of display content in the first graphical interface unchanged.

5. The method according to claim 1, wherein after the collecting first data content under the first graphical interface directly, the method further comprises:

in response to a triggering operation for at least one other component of the M components that is different from the first component, collecting at least one second data content, an attribute parameter of which is different from an attribute parameter of the first data content; and storing the first data content and the at least one second data content as one data record in a corresponding way, so that the first data content and the at least one second data content corresponding to the first data content in the data record can be obtained when the recording application program runs.

6. The method according to claim 1, wherein a second component of the M components in the first graphical interface outputs at least part of the first data content.

7. The method according to claim 1, further comprising:
obtaining a third triggering operation for the first component in a case where the first component is in the second state;
generating a third operation instruction according to the second state of the first component and the third triggering operation; and
deleting the first input data according to the third operation instruction.

8. The method according to claim 1, wherein after the obtaining a first triggering operation for a first component of the M components, the method further comprises:
generating a first switching instruction; and
controlling the first component to switch from the first state to the second state according to first switching instruction; and/or
wherein after the obtaining a second triggering operation for the first component, the method further comprises:
generating a second switching instruction; and
controlling the first component to switch from the second state to the first state according to the second switching instruction.

9. The method according to claim 1, wherein in a case where the first component is in the first state, the method further comprises:
displaying a first identifier on the first component;
and wherein in a case where the first component is in the second state, the method further comprises:
displaying at least one second identifier on the first component.

10. The method according to claim 1, wherein the first component further has a third state, and in a case where the first component is in the third state, the method further comprises: displaying a third identifier on the first component.

11. The method according to claim 10, wherein after the obtaining a first triggering operation for a first component of the M components, the method further comprises:
generating a third switching instruction; and
controlling the first component to switch from the first state to the third state according to the third switching instruction; and
in a case where the first component is in the third state, the method further comprises:
obtaining a fourth triggering operation for the first component, and generating a fourth operation instruction and a fourth switching instruction;
saving the first input data according to the fourth operation instruction; and
controlling the first component to switch from the third state to the second state according to the fourth switching instruction.

12. An electronic device, wherein the electronic device generates M components to be embedded into a first application program when installing a recording application program, M is an integer greater than or equal to 1, there is an association relationship between the M components and the recording application program, the M components further have a one-to-one correspondence with M input units comprised in the electronic device, and in a case where the M components are embedded into the first application program, the electronic device comprises:

a display unit, adapted to display a first graphical interface corresponding to the first application program when the first application program runs, the first graphical interface comprising the M components;

a first detection unit, adapted to obtain a first triggering operation for a first component of the M components, the first component having a first state and a second state, in a case where the first component is in the first state, generating a first operation instruction according to the first state of the first component;

a first response unit, adapted to call a first input unit corresponding to the first component to collect, in response to the first triggering operation obtained by the detection unit, first data content under the first graphical interface directly;

a first storage unit, adapted to store the collected first data content, so that the first data content can be obtained when the recording application program runs;

an operation instruction generation unit, adapted to obtain a second triggering operation for the first component in a case where the first component is in the second state, and generating a second operation instruction according to the second state of the first component, the first triggering operation being the same as the second triggering operation; and an operation instruction execution unit, adapted to output the first input data according to the second operation instruction.

13. The electronic device according to claim 12, further comprising K input units, the K input units having a one-to-one correspondence with K components of the M components, K being an integer greater than or equal to 1;
and wherein the first response unit is adapted to call, in response to the first triggering operation, a first input unit of the K input units that corresponds to the first component to collect first data content under the first graphical interface directly.

14. The electronic device according to claim 12, wherein the first response unit is adapted to collect, in response to the first triggering operation, first data content of display content in the first graphical interface.

15. The electronic device according to claim 12, wherein the first response unit is adapted to collect first data content and keep at least part of display content in the first graphical interface unchanged, in response to the first triggering operation.

16. The electronic device according to claim 12, further comprising:
a second response unit, adapted to collect, in response to a triggering operation for at least one other component of the M components that is different from the first component, at least one second data content an attribute parameter of which is different from an attribute parameter of the first data content; and
a second storage unit, adapted to store the first data content and the at least one second data content as one data record in a corresponding way, so that the first data content and the at least one second data content corresponding to the first data content in the data record can be obtained when the recording application program runs.

17. The electronic device according to claim 12, further comprising an output unit adapted to output at least part of the first data content on a second component of the M components in the first graphical interface.

* * * * *